US009794275B1

(12) United States Patent
Benameur et al.

(10) Patent No.: US 9,794,275 B1
(45) Date of Patent: *Oct. 17, 2017

(54) LIGHTWEIGHT REPLICAS FOR SECURING CLOUD-BASED SERVICES

(71) Applicant: Symantec Corporation, Mountain View, CA (US)

(72) Inventors: Azzedine Benameur, Fairfax Station, VA (US); Nathan S. Evans, Sterling, VA (US)

(73) Assignee: Symantec Corporation, Mountain View, CA (US)

( * ) Notice: Subject to any disclaimer, the term of this patent is extended or adjusted under 35 U.S.C. 154(b) by 140 days.

This patent is subject to a terminal disclaimer.

(21) Appl. No.: 13/930,339

(22) Filed: Jun. 28, 2013

(51) Int. Cl.
*G06F 11/00* (2006.01)
*H04L 29/06* (2006.01)
*G06F 12/14* (2006.01)

(52) U.S. Cl.
CPC .............................. *H04L 63/1416* (2013.01)

(58) Field of Classification Search
CPC ..... G06F 21/53; G06F 21/55; H04L 63/1441; H04L 1/0003; H04L 1/0009; H04L 1/0023; H04L 1/0026; H04L 1/1803; H04L 2025/03414; H04L 2025/03802; H04L 25/0212; H04L 25/0222; H04L 63/1416; H04L 63/1491
USPC ......................................... 726/22, 23, 24, 25
See application file for complete search history.

(56) References Cited

U.S. PATENT DOCUMENTS

| | | | |
|---|---|---|---|
| 5,576,972 A | 11/1996 | Harrison | |
| 6,243,756 B1 | 6/2001 | Whitmire et al. | |
| 7,120,933 B2 | 10/2006 | Mattsson | |
| 7,295,831 B2 | 11/2007 | Coleman et al. | |
| 7,305,707 B2 | 12/2007 | Mattsson | |
| 7,565,693 B2 | 7/2009 | Shin et al. | |
| 7,657,937 B1 | 2/2010 | Kumar | |
| 7,661,138 B1 | 2/2010 | Li | |
| 7,701,945 B2 | 4/2010 | Roesch et al. | |
| 7,735,135 B1 | 6/2010 | Zhou | |
| 7,757,285 B2 | 7/2010 | Kubota | |
| 7,769,851 B1 | 8/2010 | Guruswamy et al. | |

(Continued)

OTHER PUBLICATIONS

Snort—Light weight intrusion detection for networks, Proceedings of LISA '99: 13th Systems Administration Conference Seattle, Washington, USA, Nov. 7-12, 1999.*

(Continued)

*Primary Examiner* — Gary Gracia
(74) *Attorney, Agent, or Firm* — Patent Law Works LLP

(57) ABSTRACT

Methods, computer program products, computer systems, and the like, which provide security in cloud-based services using lightweight replicas, are disclosed. The methods, computer program products, computer systems, and the like include detecting an intrusion into an application server, dynamically provisioning a replica application server in a server system in response to the detecting the intrusion, and transitioning a datastream from the application server to the replica application server, where the application server is provisioned in the server system, the intrusion is an attack on the application server, and the attack is conducted via a datastream between a first computing system and the application server. The replica application server is a replica of at least a portion of the application server.

24 Claims, 13 Drawing Sheets

(56) References Cited

U.S. PATENT DOCUMENTS

| | | | |
|---|---|---|---|
| 7,941,382 B2 | 5/2011 | Stokes et al. | |
| 7,953,389 B2 | 5/2011 | Coleman et al. | |
| 7,966,659 B1 | 6/2011 | Wilkinson et al. | |
| 8,069,352 B2 | 11/2011 | Sturges et al. | |
| 8,074,276 B1* | 12/2011 | Beloussov et al. | 726/22 |
| 8,074,277 B2 | 12/2011 | Freund | |
| 8,103,906 B1* | 1/2012 | Alibakhsh | H04L 67/42 714/13 |
| 8,209,756 B1 | 6/2012 | Guruswamy et al. | |
| 8,230,505 B1 | 7/2012 | Ahrens et al. | |
| 8,272,055 B2 | 9/2012 | Wease | |
| 8,280,905 B2 | 10/2012 | Shields et al. | |
| 8,291,258 B2 | 10/2012 | Narayanaswamy et al. | |
| 8,307,418 B2 | 11/2012 | Devhdar et al. | |
| 8,312,023 B2 | 11/2012 | Shields et al. | |
| 8,402,268 B2 | 3/2013 | Dierickx | |
| 8,417,938 B1* | 4/2013 | Considine | H04L 41/12 713/151 |
| 8,429,746 B2 | 4/2013 | Capalik | |
| 8,443,440 B2 | 5/2013 | McGee | |
| 8,566,946 B1* | 10/2013 | Aziz | G06F 21/554 726/15 |
| 8,769,687 B2* | 7/2014 | Hoefelmeyer | H04L 63/1458 726/23 |
| 9,223,966 B1* | 12/2015 | Satish | G06F 21/53 |
| 2002/0046351 A1* | 4/2002 | Takemori | G06F 21/55 726/23 |
| 2004/0111636 A1* | 6/2004 | Baffes | G06F 21/554 726/23 |
| 2006/0021029 A1* | 1/2006 | Brickell | G06F 21/51 726/22 |
| 2006/0101515 A1* | 5/2006 | Amoroso | H04L 29/12009 726/23 |
| 2006/0126518 A1* | 6/2006 | Lee | H04L 47/2441 370/244 |
| 2006/0288414 A1* | 12/2006 | Kuroda | 726/24 |
| 2007/0058551 A1* | 3/2007 | Brusotti | H04L 43/00 370/241 |
| 2007/0136821 A1* | 6/2007 | Hershaft et al. | 726/27 |
| 2007/0174915 A1* | 7/2007 | Gribble | G06F 21/53 726/24 |
| 2008/0101223 A1* | 5/2008 | de los Reyes | H04L 63/145 370/230 |
| 2008/0141374 A1* | 6/2008 | Sidiroglou | G06F 21/554 726/23 |
| 2008/0235769 A1* | 9/2008 | Purcell et al. | 726/3 |
| 2010/0077483 A1* | 3/2010 | Stolfo et al. | 726/24 |
| 2010/0138921 A1* | 6/2010 | Na | H04L 63/1458 726/22 |
| 2010/0192223 A1* | 7/2010 | Ismael | G06F 21/566 726/22 |
| 2011/0055622 A1* | 3/2011 | Arai et al. | 714/4 |
| 2011/0078797 A1* | 3/2011 | Beachem et al. | 726/25 |
| 2011/0138465 A1* | 6/2011 | Franklin et al. | 726/23 |
| 2011/0276597 A1* | 11/2011 | Little | 707/770 |
| 2012/0005756 A1* | 1/2012 | Hoefelmeyer et al. | 726/24 |
| 2012/0117652 A1* | 5/2012 | Manni | G06F 21/566 726/24 |
| 2012/0260304 A1* | 10/2012 | Morris | G06F 21/56 726/1 |
| 2013/0125119 A1* | 5/2013 | Vipat | G06F 9/45533 718/1 |
| 2013/0139264 A1* | 5/2013 | Brinkley et al. | 726/24 |
| 2013/0232486 A1* | 9/2013 | Chen | G06F 9/455 718/1 |
| 2013/0298221 A1* | 11/2013 | Smith et al. | 726/13 |

OTHER PUBLICATIONS

Scarfone, Karen and Mell, Peter; "Guide to Intrusion Detection and Prevention Systems (IDPS), Recommendations of the National Institute of Standards and Technology," NIST National Institute of Standards and Technology, Technology Administration U.S. Department of Commerce, Special Publication No. 800-94, Feb. 2007, pp. 1-127.

Tangwongsan, Supachai and Pangphuthipong, Labhidhorn, "A Model of Network Security With Prevention Capability by Using Decoy Technique," Jun. 2007, pp. 253-258.

Bailey, Michael, et al., A Hybrid Honeypot Architecture for Scalable Network Monitoring, Oct. 27, 2004, pp. 1-18.

* cited by examiner

LIGHTWEIGHT REPLICAS FOR SECURING CLOUD-BASED SERVICES

GOVERNMENT RIGHTS IN THIS INVENTION

This invention was made with Government support under Contract FA8650-11-C-7190 awarded by the Defense Advanced Research Projects Agency (DARPA). The Government has certain rights in this invention.

FIELD OF THE INVENTION

The present disclosure relates to the protection of server systems and, more particularly, to the detection and prevention of attacks against server systems.

BACKGROUND

Today's networks provide computing resources and digital content to users on a massive scale. The use of networked computers and other data processing devices touches nearly every facet of our day-to-day activities, in almost every area of contemporary life, including education, business, and entertainment. With regard to their use in the business arena, networked computing environments have become the mainstay of business computing in a variety of ways, including information sharing through local networks in office environments, distributed services based on multi-tier systems across an organization, and services hosted on the Internet.

To meet these needs, data centers are used to house mission critical computer systems and associated components, and can include, for example, environmental controls (e.g., air conditioning, fire suppression, and the like), backup power supplies, redundant data communications connections, high-availability mechanisms, security mechanisms, and the like. Typically, larger organizations may have one or more such data centers. A bank, for example, may have a data center, in which its customers' account information is maintained, and transactions involving this data are performed. In another example, large municipalities may have multiple specific-purpose data centers in secure locations near telecommunications services. Collocation centers and Internet peering points are typically located in such facilities. Further, the implementation of such data centers also opens up the possibility of providing computing resources in a dynamic and homogeneous fashion.

"Cloud computing," as it is known, is the provision of computing resources (hardware and/or software) to users in a remote location by way of such computing resources being made accessible over a network (e.g., the Internet). Cloud computing can be implemented in a number of ways, including software as a service (SaaS), platform as a service (PaaS), and infrastructure as a service (IaaS), for example. In certain configurations, users are able to avail themselves of such computing resources (including storage and computational power) as a utility, for example, in a dynamic, "on-demand" manner. Typically, cloud computing entrusts remote services with a user's data, software, and computational needs. Also typically, cloud resources are usually not only shared by multiple users, but are also dynamically re-allocated in response to changes in demand. Such functionality can be further enhance through the implementation of virtualized computing resources, where various techniques, methods, or approaches are employed to allocate, maintain, and de-allocate one or more virtual (rather than physical) versions of a given computing resource, such as a virtual hardware platform, operating system (OS), storage device, or network resource, for example.

Scenarios such as the foregoing place varying demands on the network architectures supporting such functionality, in terms of features, performance, and security. This, in turn, results in a multitude of hardware and software systems underlying such networks, a multitude of protocols and standards to interconnect such systems, and a multitude of vendors and solutions supporting them. Given these variations, the logistics of creating, allocating, and maintaining such a networked environment can be daunting. As a result, providing security in such environments also becomes increasingly difficult. The ability for malware and other malicious actors to remotely exploit vulnerabilities of such hardware and software is a primary threat to cloud-based computing environments.

In protecting against such vulnerabilities, virtualized, cloud-based environments present challenges for the intrusion-detection systems and intrusion-prevention systems (IDS/IPS) typically deployed therein. It is now clear that security paradigms employed are not sufficient to fully protect such environments from intrusion. In addition, the dynamic nature of such environments (e.g., with older snapshots being quickly restored and virtual machines being moved between physical servers to optimize resource use) present challenges that do not exist in simpler architectures. Accordingly, there is a need for improved methods and systems to provide intrusion detection and prevention in a cloud-based environment. Moreover, approaches that take advantage of the dynamic nature of such environments, and so reduce the computational resources consumed by such protection are also desirable.

SUMMARY OF THE INVENTION

The present disclosure describes methods, computer program products, computer systems, and the like that provide for detecting an intrusion into an application server, dynamically provisioning a replica application server in a server system in response to the detecting the intrusion, and transitioning the datastream from the application server to the replica application server, where the application server is provisioned in the server system, the intrusion is an attack on the application server, and the attack is conducted via a datastream between a first computing system and the application server. The replica application server is a replica of at least a portion of the application server.

In some embodiments, the replica application server can be a lightweight replica of the application server, and further, the lightweight replica can be a container-based replica. Further, the process can include provisioning the application server, where the application server is provisioned with a plurality of services and the replica application server is provisioned with one or more of the plurality of services. Further still, the process can include generating an alarm, where the alarm is generated in response to the detecting the intrusion and the replica application server is dynamically provisioned in response to the alarm.

In some embodiments, the transitioning can include forwarding packets of the datastream to the replica application server. Further, the dynamically provisioning the replica application server can include associating a network address to the replica application server, where the network address is the same as a network address associated with the application server, and the transitioning can further include forwarding packets of the datastream to the network address.

In some embodiments, the dynamically provisioning the replica application server can include associating a new network address to the replica application server, where the new network address is different from a network address associated with the application server, and the transitioning can further include forwarding packets of the datastream to the new network address of the replica application server.

In some embodiments, the application server is provisioned with a plurality of services, and the replica application server is provisioned with one or more of the plurality of services. In other embodiments, the first computing system communicates with the one or more of the plurality of services. In still other embodiments, the first computing system communicates with a service of the plurality of services, and the service of the plurality of services other than the one or more of the plurality of services. In some embodiments, the process further includes analyzing the attack, where the analyzing is performed after the transitioning.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Introduction

Figure 1:
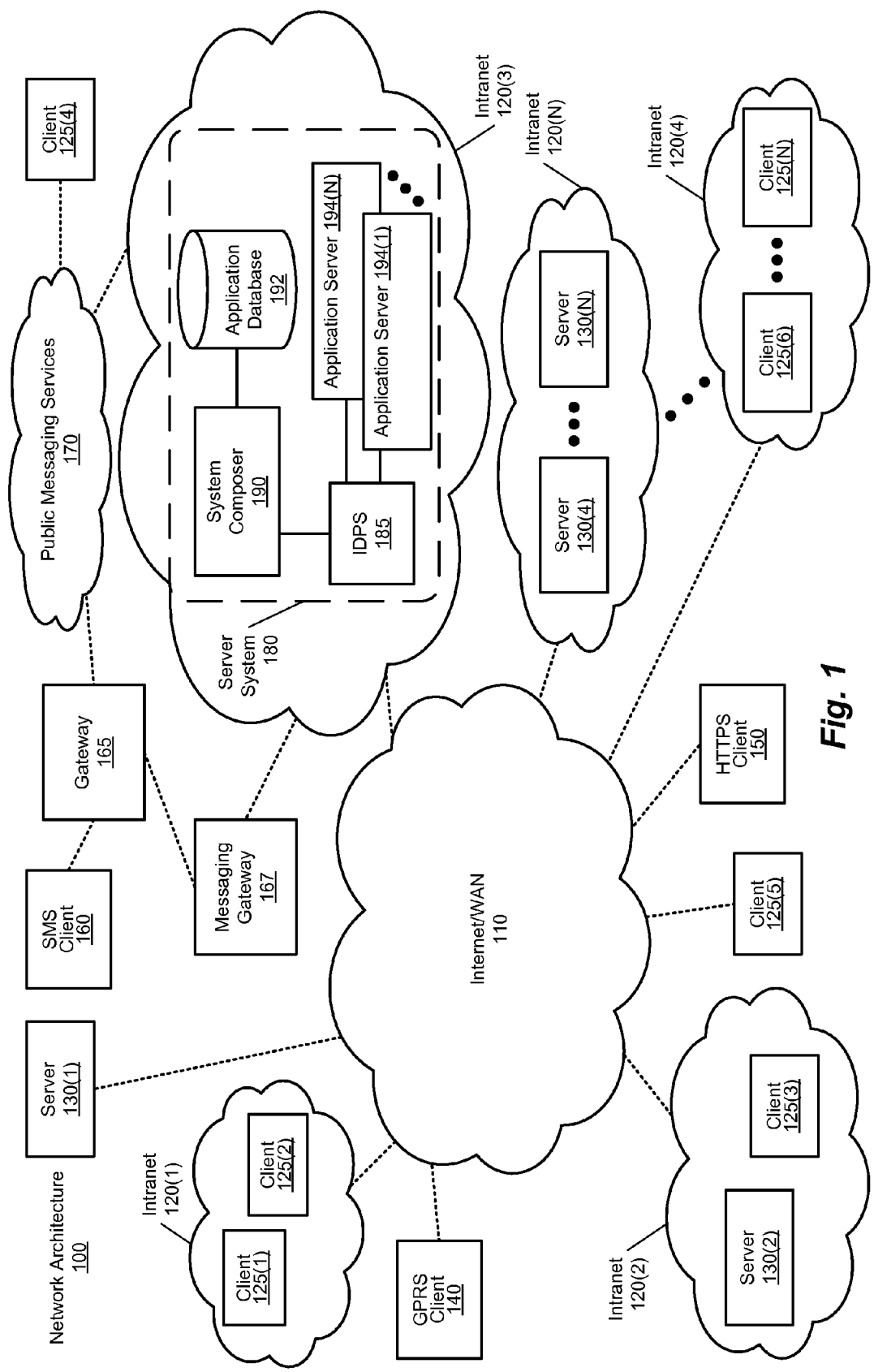
FIG. 1 is a block diagram illustrating an example of a network architecture that includes a server system according to one embodiment.

As noted, cloud computing is now a viable alternative for many users, including individuals, businesses, and other organizations, and as such, security and privacy are becoming a crucial concern in such environments. By taking advantage of the elasticity extant within a cloud computing infrastructure (e.g., as provided by the dynamic provisioning and allocation of components and computing resources), embodiments of systems such as those described herein leverage available resources (and preferably, otherwise-unused resources) to protect users and their (potentially sensitive) data and computing resources. Typically, embodiments of such systems redirect the datastream(s) of one or more attackers, attempting to infiltrate a given system from outside that system, to a replica of the system under attack.

However, as will be appreciated in light of the present disclosure, such embodiments can also be implemented such that attackers, whether attempting intrusion from inside or outside the system(s) under attack, can be attracted through the use of decoy documents or other such techniques. For example, the problem of insider attacks can be addressed using techniques such as decoy documents, data loss prevention (DLP), and other such solutions. However, such concepts are only applicable once an attacker has already successfully gained access to the system under attack. By contrast, situations addressed by embodiments of systems such as those described herein are concerned with convincing an attacker (of a cloud-based system) that they are attacking their intended target, while in fact, they are dealing with a replica of that target. Further, such an objective is facilitated by the ability to create a replica that is indistinguishable from the target, in an "on-the-fly" (dynamic) fashion. Further still, embodiments such as those described herein need not be (and, typically, are not) designed to attract attackers.

In certain embodiments of systems such as those described herein, a process for intrusion detection (e.g., using attack signatures) and management is provided that employs one of a variety of virtualization techniques in order to create one or more replicas of the virtualized components of a server system. For example, one such embodiment leverages lightweight virtualization at the operating system level (referred to herein as "container virtualization"). In such an embodiment, operations are based on the detection and management of intrusions and other such threats by way of creating such replicas and transitioning the (potentially offending) datastream(s) to the newly-created replica(s). In such a scenario, one can consider, for example, a web service hosted in a cloud-based environment (e.g., using either a complex protocol (e.g., one using protocols/architectures such as Simple Object Access Protocol (SOAP) and Representational State Transfer (REST)), a typical web server, or comparable system).

As will be appreciated in light of the present disclosure, container virtualization can be used to isolate the component(s) in question, while avoiding the need to virtualize the hardware. Instead, a container is created and used for each virtual environment needed (e.g., for a replica of a target). With container-based technologies, a kernel that supports container virtualization is used, as are appropriate user tools for the virtual environment. The kernel provides process isolation and performs resource management. This means that, even though each virtual machine executes under the same kernel, each effectively has its own filesystem, processes, memory, devices, and or other computing resources, as may be necessary and appropriate. In scenarios such as those described herein, such approaches provide the added benefit of allowing the given server system to provision the requisite component (particularly replicas) with only the resources needed to present (what appears to be) a duplicate of the target under attack.

Such a process, in general terms, begins as the result of, for example, an attacker scanning a target and attempting to exploit an open port, or sending suspicious/malicious data. As a result, a detection system (an intrusion detection and prevention system (IDPS)) triggers an alarm (the IDPS, with proper settings, generating an indication that an intrusion attempt is occurring). When such an alarm is generated, a replica of the running service (e.g., a clone of the virtual server component, running in the cloud environment, that is presently under attack, including related dependencies). In certain embodiments, such a replica is created with the same internal address (e.g., an internet protocol (IP) address within the cloud environment's internal network), and the same services executing, such that a scan performed by the attacker exhibits no discrepancies between the replica component and the original component (e.g., virtual machine). At this juncture, insider attack protection mechanisms (e.g., decoy documents or DLP) can be implemented, as well. Also at this juncture, routing performed in the internal network is modified, such that the packets are forwarded (and thus, the attacker's datastream rerouted) to the replica component (e.g., replica server executing the requisite service(s)). Thus, if the attacker succeeds at penetrating the system, only the replica component is compromised, while the initial target is quarantined by the internal network (e.g., by making the initial target unreachable from the replica component (e.g., by putting the replica and target in separate subnetworks)).

In another embodiment, alternative to the foregoing, lightweight virtualization at the operating system level (referred to as, e.g., "container virtualization") is leveraged to allow redirection of one or more attacking datastreams to a replica of the target system under attack, while consuming fewer resources than might otherwise be the case. Once again, operations are based on the detection and management of intrusions and other such threats by way of creating such replicas and transitioning the (potentially offending) datastream(s) to the newly-created replica(s). In this embodiment, as before, the example of a web service hosted in a cloud-based environment (e.g., using either a complex protocol (e.g., one using protocols/architectures such as Simple Object Access Protocol (SOAP) and Representational State Transfer (REST)), a typical web server, or comparable architecture) can be considered.

In general terms, as before, such a process begins as the result of an attacker scanning a target and attempting to exploit an open port, or sending suspicious/malicious data, for example. As a result, a detection system (an intrusion detection and prevention system (IDPS)) triggers an alarm (the IDPS, with proper settings, generating an indication that an intrusion attempt is occurring). When such an alarm is generated, a replica of the running service (e.g., a clone of the virtual server component, running in the cloud environment, that is presently under attack, including related dependencies). In certain embodiments, such a replica is created with the same internal IP (within the cloud environment's internal network), and the same services executing, such that the scan performed by the attacker exhibits no discrepancies between the replica component and the original component (e.g., virtual machine). At this juncture, insider attack protection mechanisms (e.g., decoy documents or DLP) can be implemented, as well. Also at this juncture, routing performed in the internal network is modified, such that the packets are forwarded (and thus, the attacker's datastream rerouted) to the replica component (e.g., replica server executing the requisite service(s)). However, in this embodiment, other, authorized (i.e., non-attacker) datastreams are allowed to continue to the original component uninterrupted. As before, then, if the attacker succeeds at penetrating the system, only the replica component is compromised, while the initial target is quarantined by the internal network (e.g., by making the initial target unreachable from the replica component (e.g., by putting the replica and target in separate subnetworks)).

As will be appreciated in light of the present disclosure, the transition (also referred to herein as redirection or a switchover) between the original component and the replica component is preferably performed in a low-latency manner. At the least, the transition between the original component and the replica component should occur quickly enough to prevent the attacker from detecting the operation—if the switch takes too long, the attacker may be able to detect the transition, and thus, that something has gone awry. Thus, packets are routed/forwarded in such a manner that packets associated with the attacking datastream appear (to the attacker) to be sent to and returned from the target (despite the fact that it is, in fact, the replica with which the attacker is communicating).

For example, in certain embodiments, the requisite replica(s) is (are) provisioned, including the needed services, and routing/forwarding information in the network is updated, In such a scenario, packets are routed/forwarded to/from the target prior to the update, and after the update, are routed/forwarded to/from the replica. During the updating operation, packets can be buffered, in order to preserve the information conveyed thereby. This has the additional benefit of maintaining the "illusion" of seamless communications, from the perspective of the attacker, with packets simply experiencing a normal network delay while the redirection is being performed.

For example, when using the aforementioned container virtualization, the requisite container(s) is (are) provisioned, and the network's routing/forwarding updated, as necessary. Advantageously, such an approach minimizes damage to the target as a result of a container's ability to be provisioned quickly (e.g., in less than one second). Additionally, because the replicas provisioned can be lightweight, less time is required for such provisioning than might otherwise be the case, also helping to minimize damage to the target. As will be further appreciated in light of the present disclosure, if the target application is stateless, then buffering need not be performed. Alternatively, however, if the target application is stateful, buffering can be employed to allow synchronization of the state of the replica with that of the target at the given point in time (e.g., at the point in time that redirection is performed).

As will also be appreciated in light of the present disclosure, with regard to the speed with which an attacking datastream can be transitioned to a replica, there exists the alternative of maintaining some number of "hot" (pre-provisioned) replica components as "standbys" and simply selecting an appropriate one of the pre-provisioned replica components to use in the event of an intrusion. Using such an approach, with the requisite replica component(s) having already been provisioned, transitioning to such (pre-provisioned) replica component(s) need never wait for the provisioning thereof. However, such an approach is not without its drawbacks, not least of which are the various computing resources continuously consumed by maintaining such replicas. Further, such replicas would typically need to be maintained with all the resources devoted to the component(s) being supported in this manner, thus maximizing the resources needed by such replicas. Further in this regard, for maximum flexibility, a component such as an application server would likely be maintained with a superset of the possible services with which a given application server might be provisioned, in order to be available as a replica for the largest number of possible application server configurations. Typically, the pre-provisioned replicas will all be configured with the same resources (e.g., some number of replica application servers, all pre-provisioned with the same services running), regardless of the resources in the existing components (i.e., regardless of the services running in the application servers being protected).

Such replica components, referred to herein as "heavyweight replicas," consume relatively large amounts of computing resources, as the term suggests. This is, in fact, true whether the given (heavyweight) replica is pre-provisioned, or provisioned at the time of attack. In either case, the amount of computing resources consumed is relatively large, and therefore less desirable than lighter "weight" alternatives. Such "lightweight" alternatives create replicas with something less than a full complement of the resources that could be deployed in such a component (e.g., an application server with all available services), and typically, less than even the resources employed in the component being replicated (e.g., creating a replica application server with only those services that are being employed by the intruder).

Further, in view of the computing resources consumed by pre-provisioned replicas, only a certain number of such replicas can be pre-provisioned in the first place. Thus, if such an approach were to be used, a balance would need to be struck between the number of such replicas to be created and maintained (and thus, e.g., the resources made unavailable for other uses), and the likelihood of attack and/or the maximum number of such attacks that might be expected. Such concerns also place a definitive limit on the number of attacks that such an approach can address, and lead to the possibility of such a paradigm being overwhelmed by (an even larger number of) attacks.

As has been noted, the use of lightweight replicas provides a number of other advantages, as well. For example, the ability to dynamically provision one or more replicas provides a flexible approach allows a larger number of replicas, and avoids placing a hard limit on the number of replicas that can be created. The ability to dynamically provision such replicas with only the computing resources needed (e.g., executing services) also minimizes the impact on the available computing resources of the server system in question, as well as allowing such approaches to scale with the size of the given server system. Such an advantage is particularly attractive in server systems with excess capacity that would otherwise go unused. As also noted, such embodiments avoid the need to allocate multiple different configurations up front, and avoids the need for superset configurations in replicas to support all possible configurations in existing components. Further still, the ability to dynamically provision lightweight replicas allows such systems to adapt to quickly-evolving environments, while avoiding the potential costs of constantly redesigning such protection systems. In that regard, and particularly so with regard to the sensing of multiple (potentially differing) attacks/attack types, another important aspect of embodiments of systems such as those described herein is the use of multiple attack sensors in the server system's intrusion detection and prevention system (IDPS), and the integration of such multiple attack sensors with the provisioning of (lightweight) replicas. In general terms, then, the ability to dynamically provision replica components, and the use of lightweight replicas in particular, provide a number of advantages that help to address the security needs of today's cloud-based computing environments Example Network Architecture for a Cloud-Based Environment FIG. 1 is a block diagram illustrating an example of a network architecture 100 that includes a server system according to one embodiment. Network architecture 100 includes an internetwork (depicted in FIG. 1 as an internet/wide area network (WAN) 110), which is configured to couple a number of intranets to one another (depicted in FIG. 1 as intranets 120(1)-(N)). Intranets 120(1)-(N), in turn, can include a number of components, such as one or more clients (depicted in FIG. 1 as clients 125(1)-(N)) and/or servers (depicted in FIG. 1 as servers 130(1)-(N)). Clients 125(1)-(N) and/or servers 130(1)-(N) can, for example, be implemented using computer systems such as those described in connection with FIGS. 12 and 13. Internet/WAN 110 thus communicatively couples intranets 120(1)-(N) to one another, thereby allowing clients 125(1)-(N) and servers 130(1)-(N) to communicate with one another (and can, in certain embodiments, provide for the servers of intranets 120(3) and 120(N), for example, to operate as cloud-based server systems). As is depicted in FIG. 1, clients 125(1)-(N) can be communicatively coupled to one another and to servers 130(1)-(N) as part of one of intranets 120(1)-(N), or directly via internet/WAN 110. Similarly, servers 130(1)-(N) can be coupled via intranet/WAN 110 via a direct connection to intranet/WAN 110, or as part of one of intranets 120(1)-(N).

Network architecture 100 also provides for communication via intranet/WAN 110 using one or more other devices. Such devices can include, for example, a general packet radio service (GPRS) client 140 (e.g., a "smart phone," a "tablet" computer, or other such mobile device), a secure web client (depicted in FIG. 1 as a secure hypertext transfer protocol client 150), and a basic cellular phone (e.g., using standard texting or other communication protocols, and depicted in FIG. 1 as a simple messaging service (SMS) client 160). HTTPS client 150 can be, for example, a laptop computer using the HTTP Secure (HTTPS) protocol. Support for GPRS clients, SMS clients, HTTP clients, and the like thereby provide users with communication functionality according to an embodiment in a mobile environment. As is also depicted in FIG. 1, SMS client 160 can communicate via internet/WAN 110 via several channels. SMS client 160 can communicate directly, for example, with a gateway 165, which, in turn, communicates with internet/WAN 110 via a messaging gateway 167 and, optionally, elements within intranet 120(3), for example. Alternatively, SMS client 160 can, via gateway 165, communicate with intranet 120(3) (and so, internet/WAN 110) via public messaging services 170 to which gateway 165 and intranet 120(3) are connected.

As is also depicted in FIG. 1, a client 125(4) is also able to communicate via internet/WAN 110 by way of public communication services 170 and intranet 120(3). In order to support such communications, as well as other communications according to various embodiments, intranet 120(3) includes a server system 180, as well as (optionally) providing for a number of clients (now shown), in the manner of intranet 120(2).

Server system 180 includes a number of elements that allow server system 180 to support various communications and cloud-based services, while protecting such activities from intrusion by an attacker. Among these elements are a system composer 190, an application database 192, and a number of application servers 194(1)-(N) (created, e.g., by system composer 190, at least in part using information from application database 192), among other possible such components, in communication with one another (e.g., directly, via various application programming interfaces (APIs) and/or other such interfaces, and/or other such mechanisms and/or constructs). Protecting various of the components of server system 180 is an intrusion detection and prevention system (IDPS) 195 (which can be implemented in hardware and/or software). More particularly, IDPS 195 protects application servers 194(1)-(N) from unauthorized, potentially malicious activity resulting from unauthorized access by one or more entities in network architecture 100 that are "outside" of server system 180 (an activity referred to herein as an intrusion (into server system 180)), for example by one or more of clients 125(6)-(N). Various configurations of the elements of server system 180 are discussed in greater detail, for example, in connection with FIGS. 2, 3, 4, and 5. It will also be appreciated that, in light of the present disclosure, application database 192 and various other storage entities can be implemented using any manner of computer-readable storage medium, such as that described subsequently herein.

It will be appreciated that, in light of the present disclosure, the variable identifier "N" is used in several instances in various of the figures herein to more simply designate the final element of a series of related or similar elements (e.g., intranets 120(1)-(N), clients 125(1)-(N), and servers 130(1)-(N)). The repeated use of such variable identifiers is not meant to imply a correlation between the sizes of such series of elements. The use of variable identifiers of this sort in no way is intended to (and does not) require that each series of elements have the same number of elements as another series delimited by the same variable identifier. Rather, in each instance of use, variables thus identified may represent the same or a different value than other instances of the same variable identifier.

Figure 2:
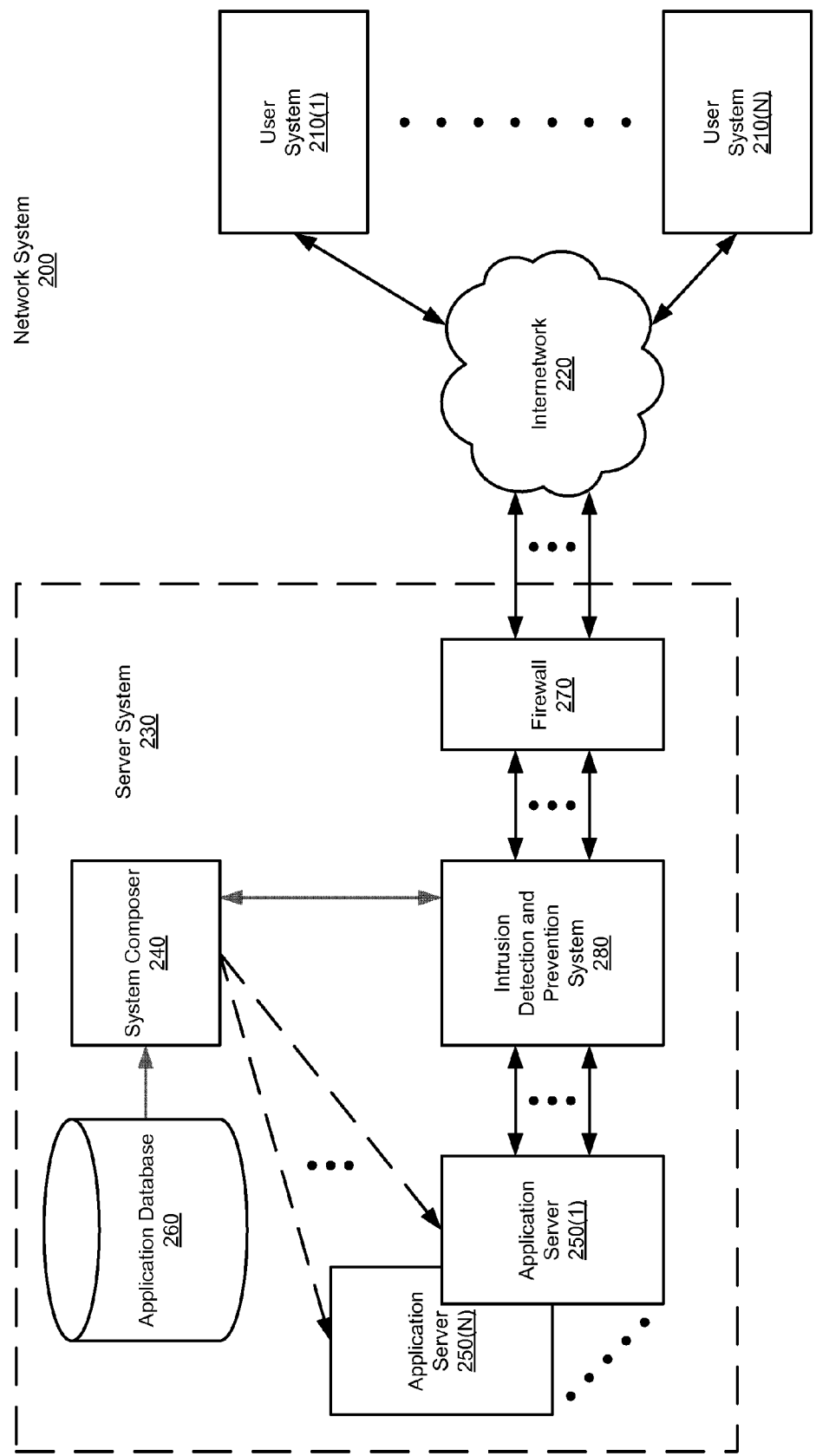
FIG. 2 is a block diagram of a network system according to one embodiment.

FIG. 2 is a block diagram of a network system 200 according to embodiments disclosed herein. As depicted in FIG. 2, network system 200 includes a number of user systems (depicted in FIG. 2 as user system 210(1)-(N)), an internetwork 220, and a server system 230. As will be appreciated, server system 230 is an example of a server system such as server system 180 of FIG. 1. Users of user systems 210(1)-(N) access server system 230, and receive services therefrom, via internetwork 220. Server system 230, in turn, includes a number of elements that facilitate the provision of services by server system 230, as may be desired by the users of user systems 210(1)-(N). To that end, server system 230 includes a system composer 240, which, in turn, is configured to compose various instances of one or more application servers (depicted in FIG. 2 as application servers 250(1)-(N)). System composer 240 creates application servers 250(1)-(N) using information retrieved from an application database 260. In so doing, system composer 240 is able to create instances of various application servers to meet the needs of the users accessing server system 230 using user systems 210(1)-(n) via internetwork 220. System composer 240 is able to do so, at least in part, by allocating computing resources within server system 230 (and/or outside of server system 230, at various points within network architecture 100). Such allocated computing resources can include a variety of hardware and/or software, whether physical or virtual. For example, such computing resources can include computational resources (e.g., central processing unit (CPU) and memory usage), data storage resources, and networking resources, among other such computing resources. Further, and as will also be appreciated in light of the present disclosure, making infrastructure available to users in a virtualized manner involves the allocation of such computing resources, including the provisioning of computational resources (e.g., in the form of provisioning virtual machines (VMs)), storage (e.g., in the form of virtual disks), and networking resources (e.g., in the form of virtual switches).

As will be appreciated in light of the present disclosure, server system 230 and its components may be subjected to an attack from one or more users employing one or more of user systems 210(1)-(N). That being the case, server system 230 provides for the protection of its components by way of, for example, a firewall 270 and an intrusion detection and prevention system (IDPS) 280. Firewall 270 can be implemented in software, hardware, or some combination thereof, and provides a network security system that examines and manages the incoming and outgoing network traffic between server system 230 and internetwork 220 (and thus, user systems 210(1)-(n)), by controlling access therebetween, in order to protect server system 230 and its components. Firewall 270 provides such protection, for example, by analyzing the data packets received and transmitted, and determining whether those packets should be allowed to proceed (e.g., based on a set of rules). Intrusion detection and prevention system 280, as its name implies, provides for the detection and prevention of malicious network activity. Thus, IDPS 280 is a security device/software module that monitors network and/or system activities for malicious activities, policy violations, and/or the like, and produces reporting information and prevents harm and/or unauthorized access to the components of server system 230.

Cloud-based environments can be attacked in a number of ways, many of which are simply variations of known network attacks. Such attacks include denial-of-service (DoS) and distributed denial-of-service (DDoS) attacks, "SYN" flooding attacks (Transmission Control Protocol (TCP) SYN flood), Internet Control Message Protocol (ICMP) flood attack, low-rate DOS attacks, TCP session hijacking, reused Internet Protocol (IP) addresses, Domain Name Service (DNS) attacks, various types of fragment attacks, traffic analysis and deep packet inspection, passive eavesdropping, active eavesdropping, reconnaissance techniques (e.g., port scanning), and other such methods. As can be appreciated, the need for detecting multiple such attacks, either employed individually or in some combination, is an important capability, and one that can be used to guide the creation of replicas and the resources that such replicas present to the attacker(s).

IDPS 280 can detect intrusions in a number of ways, including, for example, the use of thresholds, blacklists/ whitelists, alert settings, code viewing and editing, and other such techniques. As will be appreciated, a threshold is a value that sets the limit between normal and abnormal behavior. Such a threshold can be used for anomaly-based detection and stateful protocol analysis. A blacklist is a list of discrete entities, such as hosts, TCP or UDP port numbers, ICMP types and codes, applications, usernames, universal resource locators (URLs), filenames, file extensions, or the like, that have been previously determined to be associated with malicious activity. Conversely, a whitelist is a list of discrete entities that are known to be benign. Such blacklists and whitelists can be used in signature-based detection and stateful protocol analysis. Alert settings allow various actions to be performed based on the type of intrusion event and the alert generated. In code viewing and editing, some or all of the detection-related code is made viewable (e.g., intrusion signatures, programs used to perform stateful protocol analysis, and/or the like). Similarly, the ability to edit detection-related code and write new code (e.g., new signatures) allows for the customization of detection capabilities.

IDPS 280 can be configured to simply prevent intrusion attempts by attackers, for example. However, in embodiments such as those disclosed herein, IDPS 280 typically communicates with system composer 240 in order to request that system composer 240 create replicas of the allocated resources being attacked (e.g., one or more application servers), and so protect the components of server system 230 by redirecting such attacks to a replica of the component(s) under attack.

Generally, in view of the present disclosure, various techniques can be used to provision such replicas. For example, in the case of an application server (e.g., for present purposes, a virtual machine running one or more applications, accessed by users via a network), operations such as those discussed above include the creation (provisioning) of the requisite virtual machine, along with the provision of whatever virtual storage and application/system/other software that might be called for in the given scenario. Once the replica component(s) (e.g., virtual machine(s) and associated computing resources) have been provisioned, the datastream from the attacking computing system (referred to herein, e.g., as the attacking datastream) can be redirected to such replica(s).

In redirecting an attacking datastream, infrastructure (virtual and/or physical) is reconfigured such that the attacking datastream's packets are forwarded to the replica component(s) that have been provisioned for this purpose. For example, in architectures employing network address translation (NAT) to provide virtual machines access to network resources (e.g., using a host computer's internet protocol (IP) address), a replica virtual machine can be provisioned with a given IP address, such that the server system can alter routing information to redirect the attacking datastream to the replica virtual machine. This can be accomplished reconfiguring network address translation for the connection. If NAT is used, the virtual machine does not have its own IP address on the external network; instead, a separate private network is configured on the host computer. The virtual machine is then assigned an internal IP address on the server system's network by a virtual Dynamic Host Configuration Protocol (DHCP) server, for example. The IDPS (e.g., IDPS 280) uses this information to pass network data (e.g., authorized and attacking datastreams) between one or more virtual machines (e.g., application servers and replica application servers) and the external network. In turn, the IDPS also uses this information to identify incoming data packets intended for each virtual machine and forwards them to the proper destination. That being the case, once the server system provisions a replica component (or as part of that operation), the attacking datastream can be redirected by updating the relevant network address translation information. In fact, a facility such as a hypervisor can provide for the sharing of a physical network interface between a number of virtual components, and in so doing, support one or more virtual network interfaces for each. Networking services can provided to virtual machines in a number of ways, including bridging and routing, in addition to network address translation.

More specifically, such configuration allows the creation of an association between the host's domain (e.g., the physical network interface (and its associated addressing information)) and each application server (and its virtual network interface (and its associated addressing information)). In a TCP/IP environment, for example, a set of media access control (MAC) and IP addresses are defined in advance of provisioning, in order to allow routing information for each application server to be added to the host network interface routing table before the application server(s) is (are) started. Thus, a currently-unused network addresses (e.g., MAC layer/IP layer addresses) are assigned to each application server provisioned (and which are released upon the given application server's termination). As will be appreciated in light of the present disclosure, as part of provisioning a replica application server, the replica application server's network addresses are made available to the IDPS, which can then use this information to redirect the attacking datastream to the replica application server (rather than the attacker's intended target).

Figure 3:
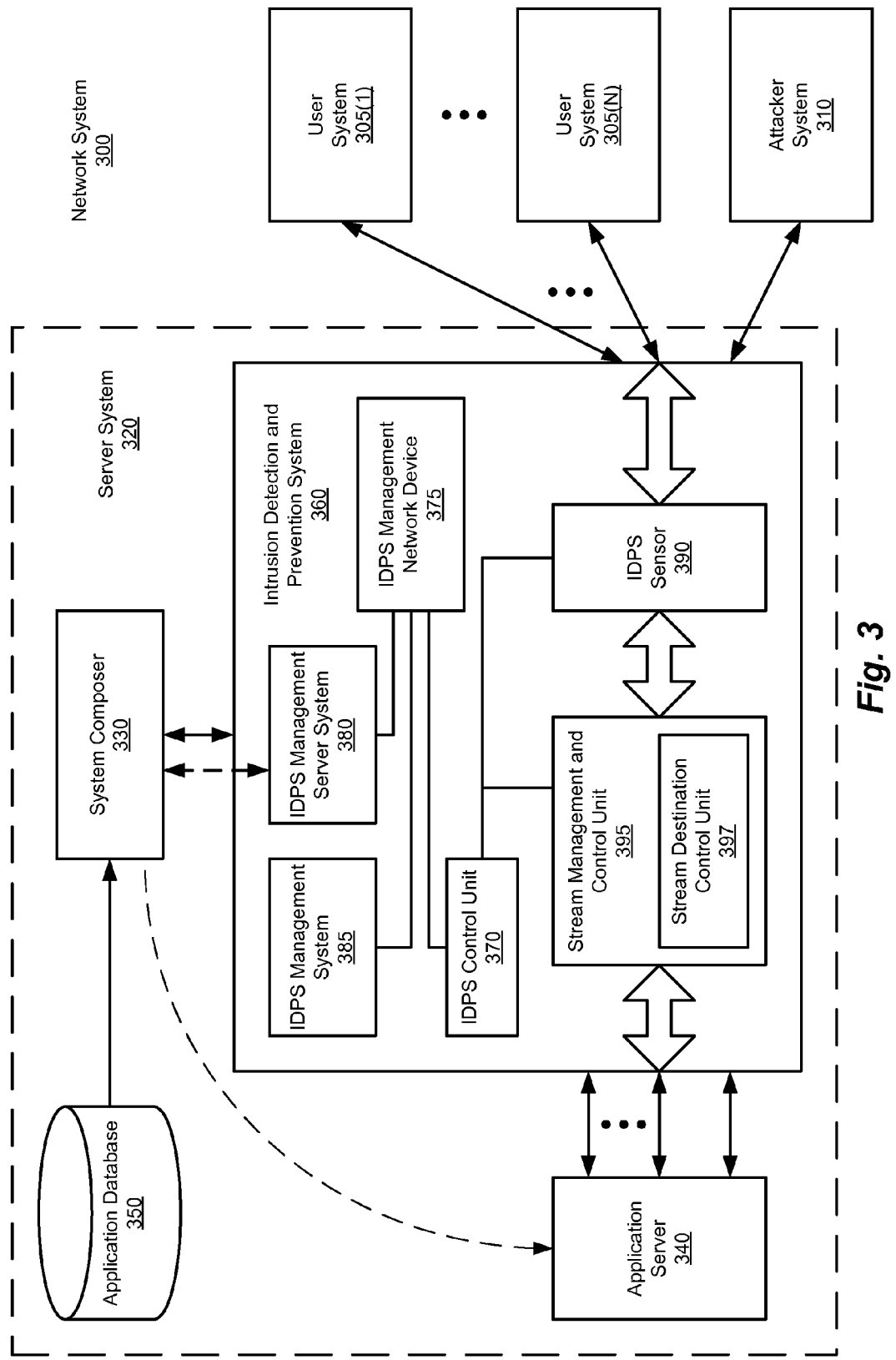
FIG. 3 is a block diagram illustrating an example of a network system that includes a server system according to one embodiment.

FIG. 3 is a block diagram illustrating an example of a network system 300 that includes a server system according to an embodiments of the systems disclosed herein. As depicted in FIG. 3, network system 300, in an manner similar to that of network system 200, includes a number of user systems (depicted in FIG. 3 as user systems 305(1)-(N)), but also includes a user system that has been appropriated by an attacker (depicted in FIG. 3 as an attacker system 310). As noted earlier, such attacks can take many forms, but the common thread among such attacks is the attacker's attempt to gain unauthorized access to the (systems) in question and/or interfere with such systems' proper operation. Detection of such intrusions can include techniques such as signature-based intrusion detection (where a certain attack or type of attack involves a specific pattern) and anomaly-based intrusion detection (where a certain attack or type of attack involves anomalous network activity/access/set of operations). Thus, in the first kind of intrusion detection model, an event model corresponding to a given attack is detected by matching audited events and known attack parameters/values, upon which an alert is generated. In the latter case, measurement parameters (e.g., the number of audit events, time interval, resource consumption, and the like) are tracked, and an alert generated upon certain thresholds (or combination of thresholds) are met or exceeded.

In a manner similar to that of server system 230, network system 300 includes a server system 320, which is accessed by user systems 305(1)-(N) in order to obtain the resources and services desired by the users of user systems 305(1)-(N). It will be appreciate that, for simplicity, an internetwork is not shown in FIG. 3, but the network communications in network system 300 would typically take place via such a network, though it will be appreciated in light of the present disclosure that attacks such as those described herein can, in fact, be perpetrated by one or more attackers located within the given network (as mentioned earlier, referred to herein as an "internal attack"). Unfortunately, the attacker (e.g., via attacker system 310) also attempts to gain access to resources within server system 320 by surreptitious means. For example, such access may be explored by an attacker through a port scan attack, where the attacker sends client requests to a range of server port addresses on a host, with the goal of finding an active port and exploiting a known vulnerability of that service, and thus gain access to the service/system (target) in question.

As before, server system 320 includes a system composer 330, which is configured to create one or more application servers (which is depicted in FIG. 3 as having created, e.g., application server 340) using information obtained from an application database 350. As depicted in FIG. 3 in greater detail, intrusion detection and prevention system 360 provides functionality comparable to that provided by IDPS 280 of FIG. 2. To do so, IDPS 360 includes an IDPS control unit 370, which is configured to control certain components of IDPS 360 via an IDPS management network device 375. IDPS control unit 370 is thus coupled to an IDPS management server system 380 and an IDPS management system 385 via IDPS management network device 375. IDPS control unit 370 also interfaces with an IDPS sensor 390 and a stream management and control unit 395. Stream management and control unit (SMCU) 395 includes a stream destination control unit (SDCU) 397, which controls the destination of (and thus communications via) one or more datastreams with the resources and components of server system 320 with which a given network packet stream communicates. It will be appreciated in light of the present disclosure that, while IDPS sensor 390 is implemented as a sensor, its functionality can alternatively be implemented by an agent or other such construct designed to monitor and analyze network activity conveyed by IDPS 360. Thus, the term "sensor" is used herein to describe a construct that is designed to monitor the network(s) within server system 320, including, for example, network-based, wireless, and network behavior analysis technologies. Alternatively, such functionality can be implemented using an agent, including, for example, host-based IDPS technologies.

In certain embodiments, IDPS management system 385 is a centralized device (whether physical or virtual) that receives information from IDPS sensor 390 via the internal network of IDPS 360 (the functionality of which is provided, at least in part, by IDPS management network device 375), and, along with IDPS control unit 370, manages the functionality provided by IDPS 360. IDPS control unit 370 and IDPS management system 385 also manage other elements of IDPS 360, as well, as illustrated in FIG. 3. In such embodiments, analysis of the intrusion (e.g., event information) is performed by IDPS management system 385, thereby identifying events that individual sensors, agents, or the like might otherwise be unable to thus identify. Matching event information from multiple sensors or agents (e.g., identifying events triggered by the same IP address) is thus made possible, allowing for the identification of not just single events (e.g., by way of signature-based analysis), but also of anomalous activities.

In the embodiment depicted in FIG. 3, IDPS management server system 380 interfaces the elements of IDPS 360 and its internal network with other elements of server system 320 (e.g., system composer 330). In so doing, IDPS management server system 380 provides system composer 330 with an indication as to the need for the creation of one or more application server replicas (e.g., a replica of application server 340). IDPS management server system 380 also provides a repository for event information recorded by the sensors, agents, and/or management servers in IDPS 360, such as IDPS sensor 390, as well as information regarding the virtual components currently provisioned (e.g., information regarding application server 340), any replicas that have been created, and other such information, as may be useful to the operations of IDPS 360 and server system 320. Typically, IDPS management server system 380 also maintains information regarding various threats (e.g., signatures, characteristics of threats, and other such parameters and information). The responsibility for such IDPS management functions can also be shared with IDPS management system 385, as has been noted.

For purposes of the present discussion, functionality provided by IDPS sensor 390 includes the ability to detect attacks using techniques such as the signature-based intrusion detection and/or the anomaly-based intrusion detection techniques discussed earlier. For example, IDPS sensor 390 can be configured to detect intrusion events using an event model corresponding to a given attack by matching audited events and known attack parameters/values. Alternatively (or in combination therewith), IDPS sensor 390 can also be configured to detect anomalous activities by monitoring one or more measurement parameters (e.g., the number of audit events, time interval between accesses, resource consumption, and the like) and generating an alert upon certain thresholds (or combination of thresholds) being met or exceeded.

Also for purposes of the present discussion, SMCU 395 provides functionality that includes elements that facilitate control over the datastreams monitored by IDPS 360. Such functionality includes the functions performed by SDCU 397, which provides network routing functionality such as that noted previously. As noted, the functionality related to altering the routing of datastreams within server system 320 can be provided by (or such responsibilities shared with) other elements therein. For example, a router (either virtual or physical; not shown) can be interposed between IDPS 360 and the application servers created, and the routing table(s) (and/or other such constructs therein) managed and updated accordingly. Also, as will be appreciated in light of the present disclosure, the functionality provided by SDCU 397 (at least with regard to the routing of datastreams (e.g., network address translation)), while described as being included in the SDCU in certain of the examples presented herein, can, in fact, be implemented in other elements of such server systems, including a separate (possibly virtual) routing unit, such as that described earlier.

Figure 4:
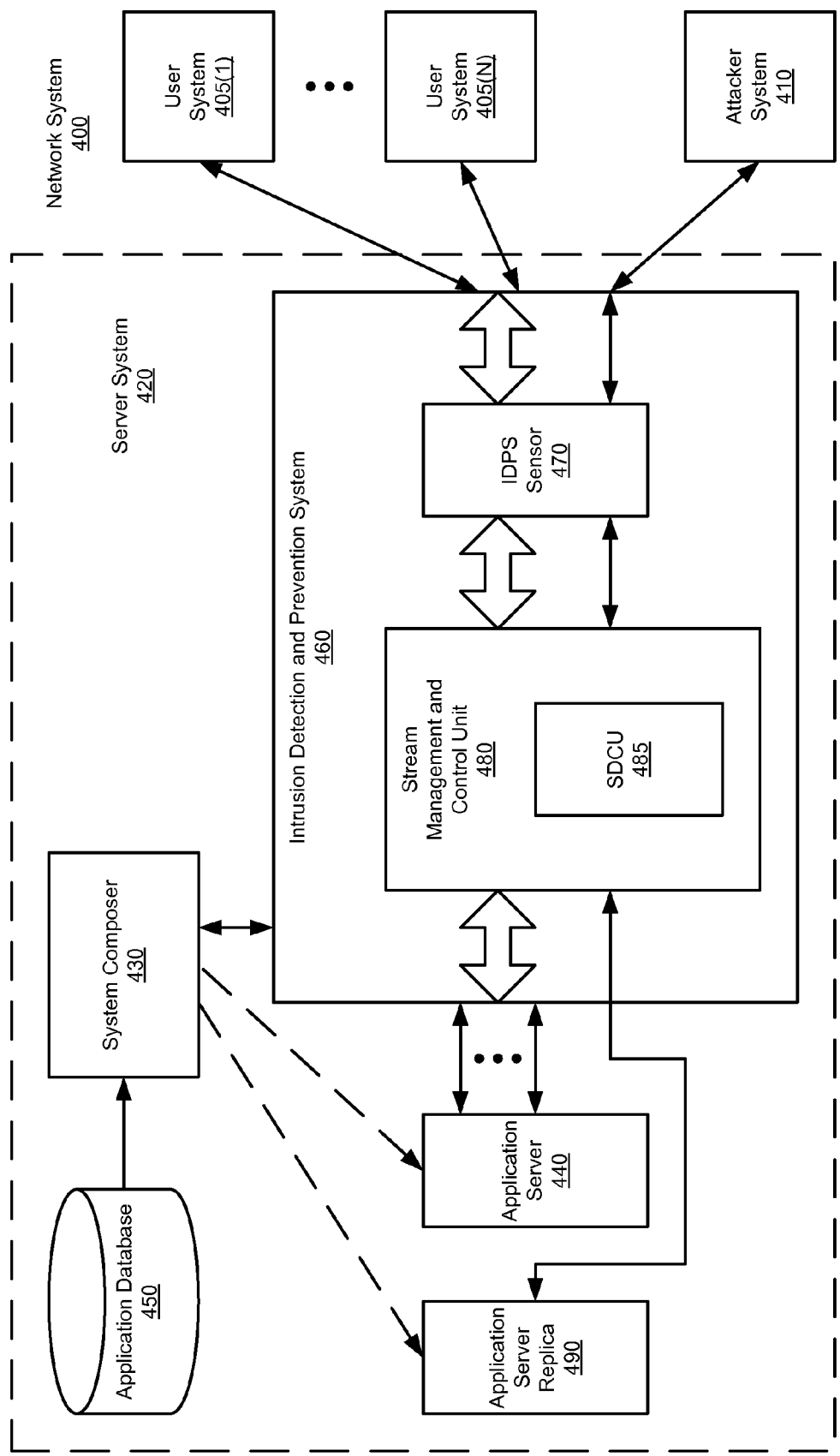
FIG. 4 is a block diagram illustrating an example of a network system that includes a server system according to one embodiment.

FIG. 4 is a block diagram of a network system 400 illustrating certain details of a server system according to embodiments such as those disclosed herein. As before, network system 400 includes a number of user systems (depicted in FIG. 4 as user system 405(1)-(N)), as well as an attacker system 410. User systems 405(1)-(N) and attacker system 410 communicate with a server system 420. As before, the details of the networking architecture (e.g., internetwork) that conveys communications between user systems 405(1)-(N) and attacker system 410, and server system 420 are not shown in FIG. 4 for the sake of clarity. According to embodiments of systems such as those described herein, server system 420 includes a system composer 430, as before. In the scenario depicted in FIG. 4, system composer 430 has created an application server 440 using information from an application database 450. Also as before, server system 420 includes an intrusion detection and prevention system 460 that is in communication with system composer 430. IDPS 460 monitors and protects the components of server system 420, such as application server 440, by detecting and preventing intrusions by one or more attackers, as is described in detail elsewhere herein. Also as before, IDPS 460 includes an IDPS sensor 470, as well as a stream management and control unit 480. Stream management and control unit 480 includes a stream destination control unit (SDCU) 485.

In operation, system composer 430 creates, for example, an application server (depicted in FIG. 4, e.g., as an application server 440) using information from application database 450, for example. Thus, users of one or more of user systems 405(1)-(N) are able to avail themselves of the services provided by application server 440, as such users may need and be authorized to access. However, an attacker may attempt to attack server system 420 (e.g., by attempting to gain unauthorized access and/or prevent authorized access to server system 420 and its components/resources, via attacker system 410, for example). In such case, IDPS sensor 470 detects the unauthorized (and possibly malicious) access being attempted, as part of the management of datastreams from such systems by IDPS 460. Upon the detection of such unauthorized access, IDPS sensor provides SMCU 480 with information regarding the attempt. This information can be as simple as an indication that some manner of intrusion has occurred, or can include information regarding the components of server system 420 that are under attack, the origin of the attack, datastream information (network traffic information such as protocol, network addresses, port number, and the like), and/or other such information.

At this point, IDPS 460 notifies system composer 430 of the attempt (e.g., by sending an alert, a message, or other such notification to system composer 430), and requests that system composer 430 create a replica of the component(s) potentially under attack. The creation of such replicas can be accomplished in a number of ways, in view of the attack, the components attacked, and other such considerations. In the scenario depicted in FIG. 4, system composer 430 creates a replica of application server 440 (depicted in FIG. 4 as an application server replica 490), using information from application database 450. Once system composer 430 has successfully created application server replica 490, IDPS 460 (and more specifically, SDCU 485 of SMCU 480) switches the datastream belonging to attacker system 410, from application server 440 over to application server replica 490.

In certain embodiments, application server replica 490 is a lightweight replica of application server 440. As noted earlier, such a lightweight replica is, generally, a copy of the component in question having something less than a full complement of the resources that could be deployed in such a component (e.g., an application server with only those services involved in the given attack, rather than all possible services), and typically, less than even the resources employed in the component being replicated (e.g., creating a replica application server with only those services that are being employed by the intruder). Further, and as also noted earlier, once the server system under attack has created such a replica (or as part of such an operation), the attacking datastream is redirected to the replica in a manner that is undetectable to the attacker (e.g., in a manner that does not result in undue loss of packets, loss of connection, or the like), or at the least, in a manner likely to go unnoticed by the attacker (or at the very least, with a sufficient level of confidence that such would be the case (e.g., 90% chance of being successful).

It should be noted that embodiments of the systems disclosed herein also offer the benefit of addressing a "false positive" situation, in which a user accesses server system 420 and its components in a manner that is benign, but is mistakenly identified as malicious (e.g., where the user's activity appears anomalous, but is, in fact, benign). In such a circumstance, the user's datastream is redirected from the "target" component (e.g., application server 440) to a replica component (e.g., application server replica 490). This can include splitting the user's datastream (or redirecting only one or the user's multiple datastreams), in the manner described further in connection with FIG. 11. At this juncture, the now-redirected datastream can be analyzed further, for example, in order to determine whether or not the datastream in question is, in fact, malicious. Such a scenario also presents the possibility of performing a two-step (or more) analysis of data streams, in which, for example, anomaly-based detection of intrusions is performed to identify potentially-malicious datastreams, which are then redirected to a replica component, where further analysis (e.g., signature-based analysis) is performed on the now-isolated datastream. Once such further analysis is performed, a determination can be made as to whether the datastream in question is, in fact, malicious. If the datastream is malicious, the replica can be maintained in order to protect the components of server system 420. Alternatively, if the datastream is determined to be benign, the datastream can either be maintained on the replica, or, in the alternative, be transitioned back to the original "target" (which provides the advantage of allowing the replica component deprovisioned).

Figure 5:
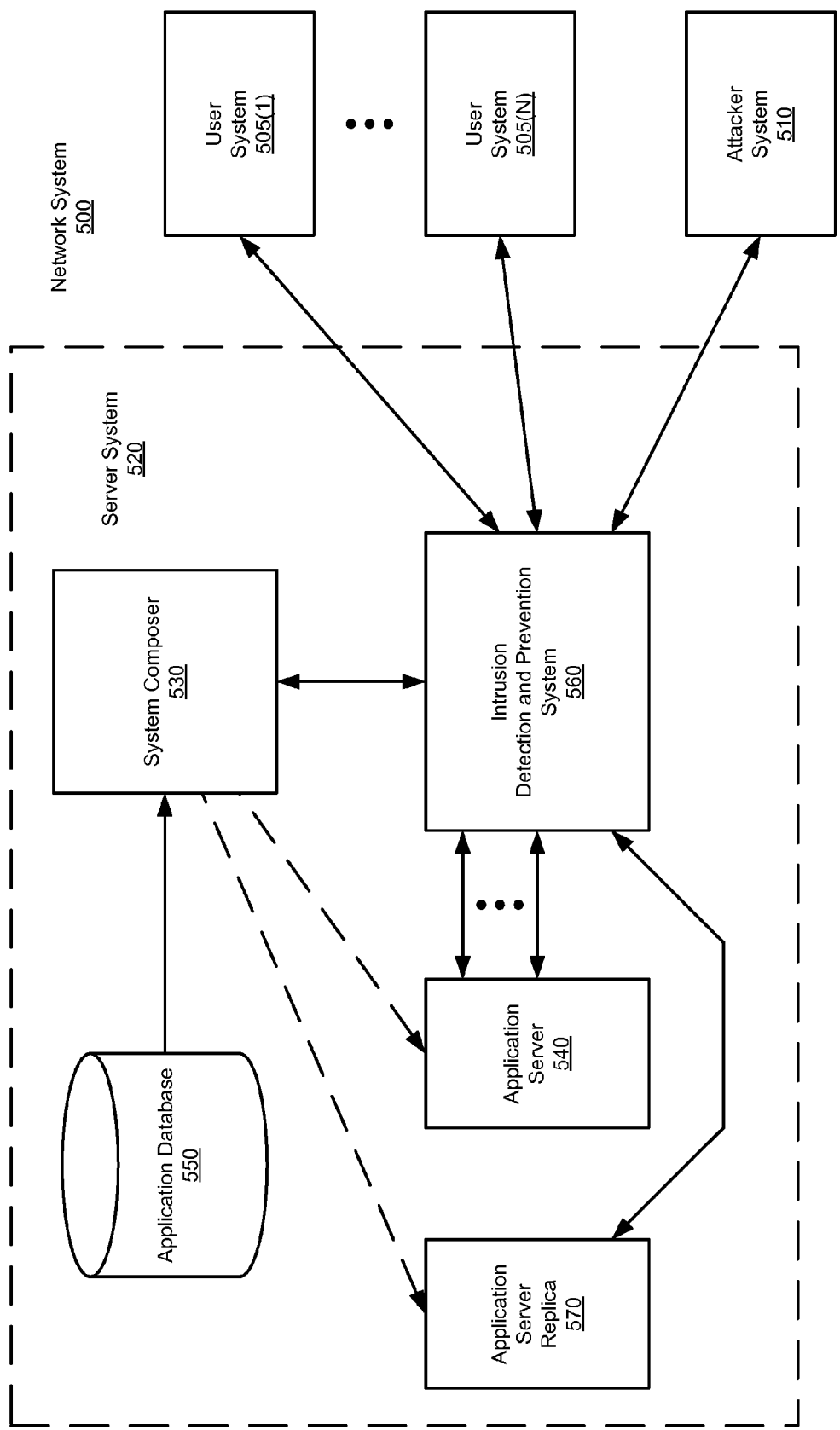
FIG. 5 is a block diagram illustrating an example of a network system that includes a server system according to one embodiment.

FIG. 5 is a block diagram illustrating an example of a network system 500 that includes a server system according to embodiments of the systems disclosed herein. As before, server system 500 includes a number of user systems (depicted in FIG. 5 as user systems 505(1)-(N)) and an attacker system 510. User systems 505(1)-(N) and attacker system 510 communicate with a server system 520 via a network such as that depicted in FIG. 2. Also as before, server system 520 includes a system composer 530 that is configured to create application servers and allocate other cloud-based elements (depicted in FIG. 5, for example, as an application server 540), at least in part using information from an application database 550, for example. Server system 520 also includes an intrusion detection and prevention system 560, which is configured to detect and prevent (potentially malicious) intrusions into server system 520 and its components.

In the scenario depicted in FIG. 5, attacker system 510 is used by an attacker in an attempt to gain unauthorized access to application server 540. Upon the detection of this intrusion, detection intrusion and prevention system 560 notifies system composer 530 of the attempt, and requests that system composer 530 create a replica of application server 540 to which the network traffic from (and to) attacker system 510 can be rerouted. In response, system composer 530, using information from application database 550 (and/or other sources), creates an application server replica 570. In one embodiment, system composer 530 provides network address information for application server replica 570 to IDPS 560, either as part of these operations or subsequently thereto, and/or performs other reconfiguration operations to effect the redirection of the attacking datastream. System composer 530 then notifies intrusion detection and prevention system 560 of the creation of application server replica 570 (and possibly other information related to the creation of application server replica 570, such as that just noted). In response, intrusion detection and prevention system 560 reroutes network traffic to and from attacker system 510 (intended to application server 540) to and from application server replica 570. These and related operations and processes are now described in further detail, in connection with FIGS. 6, 7, 8, 9, and 10.

Example Operations within a Cloud-Based Environment

Figure 6:
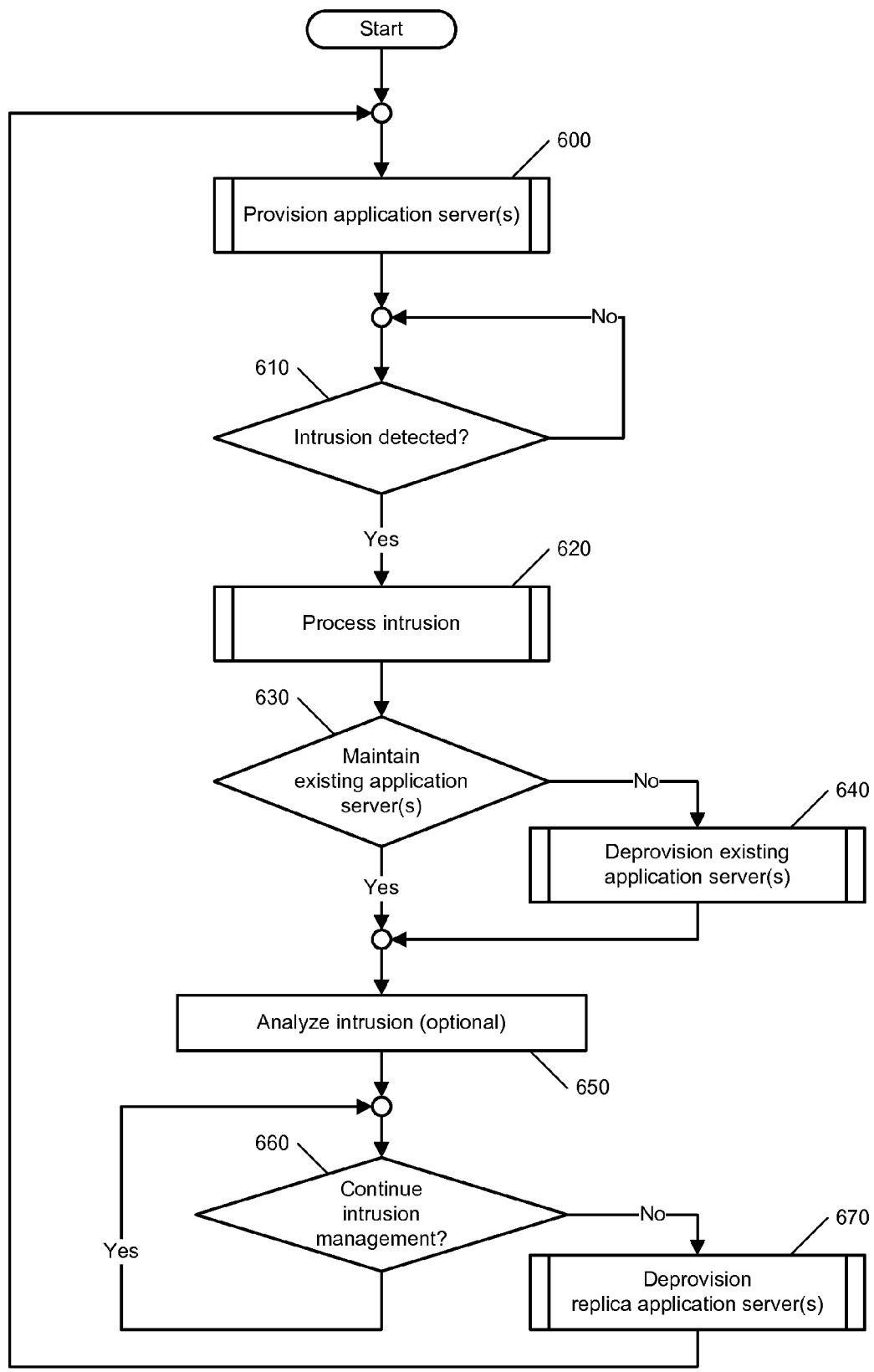
FIG. 6 is a simplified flow diagram illustrating an example of operations performed in detecting and processing an intrusion, according to one embodiment.

FIG. 6 is simplified flow diagram illustrating an example of certain operations performed in detecting and processing an intrusion, according to embodiments of systems such as those described herein. The process of FIG. 6 begins with the provisioning of one or more application servers (step 600). Once the requisite application server(s) (as well as any other resources that might be needed) are provisioned, the server system being protected, and more specifically, the intrusion detection and protection system thereof, waits for the detection of an intrusion (step 610). As will be appreciated in light of the present disclosure, the server system in question processes various (authorized) datastreams, and provides the computer resources and processing desired by the (authorized) users accessing the service system, concurrently while performing operations related to intrusion detection. While no intrusions are detected, the process simply loops, waiting the detection of one or more intrusions (step 610), with the datastreams continuing to be serviced in a concurrent manner.

Upon the detection of an intrusion (step 610), the server system's intrusion detection and protection system initiates the process of managing the intrusion (step 620). In one embodiment, such processing includes the creation of one or more server replicas, and the redirection of the attacking datastream to the newly-created server replica(s). Once the intrusion has been processed (step 620), a determination is made as to whether one or more of the existing application servers are to be maintained while the intrusion is processed (step 630). Typically, any existing application server(s) will be maintained, in order to provide continuity of service to existing/authorized users, within the resource constraints of the server system (e.g., assuming sufficient computing resources are or can be made available; and thereby making lightweight replicas of entities such as application servers advantageous). However, if one or more of the existing application servers will not be maintained (e.g., are to be deprovisioned, and their corresponding resources deallocated) (step 630), the existing application servers in questions are deprovisioned (step 640).

Once the requisite existing application servers have been deprovisioned (step 640), if any (step 630), the intrusion can, optionally, be analyzed (step 650). As will be appreciated in light of the present disclosure, such intrusion analysis need not necessarily be performed, and is indeed optional. Further, the analysis performed at this juncture can include that such as described elsewhere herein, in which specific analysis (e.g., signature-based analysis) is performed (more general analysis (e.g., anomaly-based analysis) having been performed to make a preliminary determination).

At this point, the intrusion (or intrusions, as the case may be) are processed in an ongoing manner, as are the services related to any existing application servers that are maintained. As part of this ongoing intrusion management, a determination is made as to whether the management of such intrusions should be continued (step 660). The processing of such intrusions and the maintenance of one or more existing application servers continues (as may be desired and appropriate) until such time as the intrusion protection and detection system determines that such intrusion management is no longer needed (step 660). Such may be the case where the attacker terminates the intrusion or the intrusion is terminated by the intrusion protection and detection system, for example.

Once a determination is made (e.g., by the server system, a system administrator, or the like) that intrusion management is to be concluded (step 660), the one or more replica application servers are deprovisioned (step 670). At this juncture, the process can return to the provisioning of one or more application servers (step 600), for example. For example, such might be the case where, one or more existing application servers having been deprovisioned, such (now-deprovisioned) application servers are (re)provisioned. As will be appreciated in light of the present disclosure, once any existing replica application servers are deprovisioned (step 670), the process can, in the alternative, return to one or more other points in the process depicted in FIG. 6, such as to the point of awaiting the detection of an intrusion (step 610), for example. Such might be the case where all existing application servers are maintained upon detection of the intrusion, and the attacking computer system's datastream is simply redirected to a replica application server created in response thereto, preferably with no interruption (or no significant interruption) to any of the existing application servers. In such a scenario, given that the desired application servers remain provisioned, only the replica application server(s) need be provisioned and deprovisioned.

It will be appreciated that FIG. 6 and the other flow diagrams depicted herein illustrate examples of operations modules according to one or more embodiments of systems such as those described herein. It is appreciated that operations such as those discussed herein may include, for example, commands entered directly into a computer system, by operations executed by application specific hardware modules, operations executed by software modules, or some combination thereof. Further, the operations referred to herein may be implemented as modules or portions of modules (e.g., software, firmware, or hardware modules). For example, although the described embodiment(s) include software modules and/or include manually-entered commands, the various modules may be application specific hardware modules. The software modules discussed herein may include script, batch or other executable files, or combinations and/or portions of such files. The software modules may include a computer program or subroutines thereof encoded on computer-readable media.

The functionality of the operations referred to herein may correspond to the functionality of modules or portions of modules, or may be executed by a computer system as a result of executing a module (e.g., a software module), or portion thereof. Thus, in the methods described herein, the operations thereof and modules therefor may be executed on a computer system configured to execute the operations of such methods and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

The software modules described herein may be received by a computer system such as that described subsequently herein, for example, from some manner of computer readable media. Such computer readable media may be permanently, removably, or remotely coupled to the computer system in question. Such computer readable media may non-exclusively include, for example, any number of the following: magnetic storage media including disk and tape storage media; optical storage media such as compact disk media (e.g., CD-ROM, CD-R, etc.) and digital video disk (DVD) storage media; nonvolatile memory storage memory including semiconductor-based memory units such as FLASH memory, EEPROM, EPROM, ROM or application specific integrated circuits; volatile storage media including registers, buffers or caches, main memory, RAM, etc.; or the like. In a UNIX-based embodiment, the software modules may be embodied in a file which may be a device, a terminal, a local or remote file, a socket, a network connection, or the like. Other new and various types of computer-readable media may be used to store and/or transmit the software modules discussed herein.

Additionally, it will be recognized, in light of the present disclosure, that the boundaries between modules are merely illustrative and alternative embodiments may merge modules or impose an alternative decomposition of functionality of modules. For example, the modules discussed herein may be decomposed into sub-modules to be executed as multiple computer processes. Moreover, alternative embodiments may combine multiple instances of a particular module or sub-module. Furthermore, those skilled in the art will recognize that the operations described in exemplary embodiment are for illustration only. Operations may be combined or the functionality of the operations may be distributed in additional operations in accordance with the invention.

Alternatively, such operations may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Figure 7:
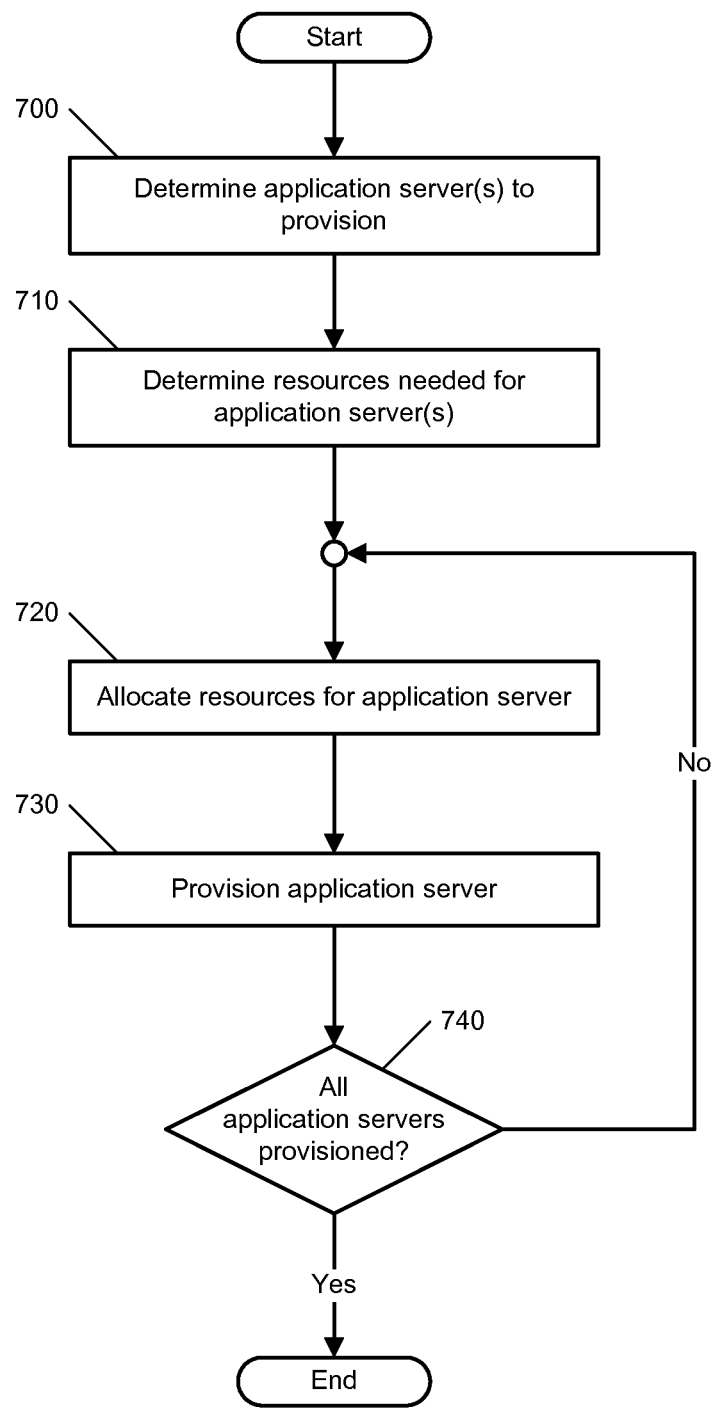
FIG. 7 is a simplified flow diagram illustrating an example of operations performed in provisioning one or more application servers, according to one embodiment.

FIG. 7 is a simplified flow diagram illustrating an example of certain operations performed in provisioning one or more application servers, according to embodiments of systems such as those described herein. FIG. 7 provides an example of operations performed in effecting the provisioning of one or more application servers, as envisioned in step 600 of FIG. 6. In the provisioning one or more application servers by way of a process such as that depicted in FIG. 7, a determination is made as to the one or more application servers to be provisioned (step 700). In making such a determination, the server system, and more specifically, a system composer or comparable component, makes a determination based on requests received from users and information available to the system composer (e.g., such as from an application database). Information from such an application database can include, for example, a list of services to be run on the server(s) in question. Such information can also be of use in determining the services currently running on a given target, as well as other information that can be used in provisioning whatever replica(s) may be needed later.

Once the server system determines which components (e.g., one or more application servers) are to be provisioned (step 700), the server system determines the resources needed by those components (step 710). As noted earlier, such computing resources can include a variety of hardware and/or software, whether physical or virtual. For example, such computing resources can include computational resources (e.g., central processing unit (CPU) and memory usage), data storage resources, and networking resources, among other such computing resources.

Once the system composer determines the component(s) (e.g., application server(s)) to be provisioned and the resources needed thereby and the provisioning/allocation thereof (steps 700 and 710), the system composer goes about provisioning those application servers. In the example depicted in FIG. 7, the system composer allocates the necessary resources for a given application server (step 720), and then provisions that application server (step 730). Once the given application server has been provisioned with the requisite resources (steps 720 and 730), a determination is then made as to whether one or more other application servers remain to be provisioned (step 740). If further application servers remain to be provisioned (step 740), the process loops and repeats the allocation of resources and provisioning of the next application server (steps 720 and 730). This process repeats until the desired application servers have been provisioned (step 740). At this point, the process concludes.

Figure 8:
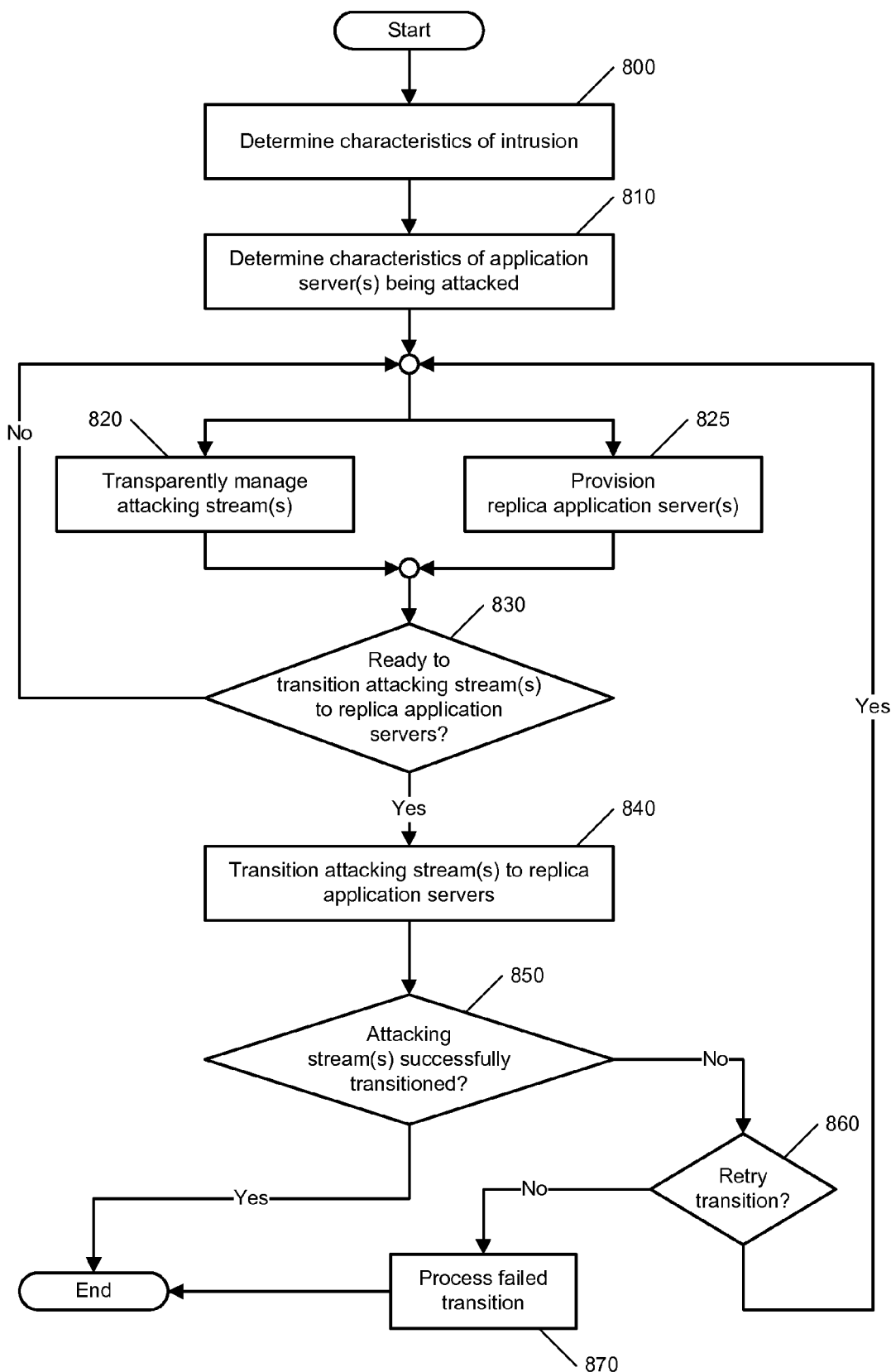
FIG. 8 is a simplified flow diagram illustrating an example of operations performed in processing an intrusion, according to one embodiment.

FIG. 8 is a simplified flow diagram illustrating an example of the operations performed in processing an intrusion, according to embodiments of systems such as those disclosed herein. FIG. 8 is an example of the operations performed in effecting intrusion processing, such as that envisioned in step 620 in FIG. 6. The process depicted in FIG. 8 begins with a determination as to one or more of the characteristics of the intrusion (step 800). As noted earlier, detection of such intrusions can include techniques such as signature-based intrusion detection (where a certain attack or type of attack involves a specific pattern) and anomaly-based detection (where a certain attack or type of attack involves anomalous network activity/access/set of operations).

A determination can then be made as to one or more characteristics of the application server(s) being attacked (step 810), such as the services running on the application server, ports in use, storage resources offered, and other such characteristics. Once the aforementioned determinations have been made, thereby determining the characteristics of the intrusion and the application servers being attacked (steps 800 and 810), a number of operations are then performed. Such operations include the management of the datastream(s) from attacking systems (step 820), which are preferably performed in a manner completely transparent to the attacker (and also preferably, to the legitimate users of the server system). Concurrently, one or more replica application servers (and/or other such computing resources, as may be needed to deal with the intrusion) are provisioned (step 825). Provisioning of such replica application servers can be accomplished in a manner comparable to the process depicted in FIG. 7, although a variety of alternatives can be envisioned in light of the present disclosure. For example, the replica application servers thus provisioned can be provisioned in a manner such that only the services needed to deceive the attacking system are provisioned/allocated. More specifically, and by further example, an application server (providing a Web-based service among a number of other services) might be under attack by way of port scanning. In such a scenario, the IDPS alerts the system composer of the intrusion, and the system composer, in turn, provisions the requisite replica application server. In so doing, the system composer provisions the replica application server with only the necessary services (in this example, the Web service), without provisioning services on the replica application server that are not under attack on the (target) application server (in this example, the other services executing on the (target) application server). Also at this juncture (e.g., as part of the provisioning of the replica application server), the system composer allocates the requisite network address(es) and provides this network addressing information to the IDPS (and, more specifically, to the IDPS's SDCU), such that, upon successful provisioning of the replica application server, the SDCU can redirect the attacking datastream to the replica application server (and more specifically, to the Web service executing therein).

A determination is then made as to whether the server system, and in particular the server system's stream destination control unit, are ready to transition the attacking datastream(s) to the replica application server(s) (step 830). Until such time as the server system is ready to perform this transition, the process loops (step 830). Once the replica application server(s) and the server system (stream destination control until) are ready (step 830), the attacking datastream(s) are transitioned to one or more of the replica application servers (step 840). A determination is then made as to whether the attacking datastream(s) have been successfully transitioned to the replica application servers (step 850). If the transition was not successful (step 850), the process can attempt to retry the transition (step 860). If the transition is to be retried (step 860), the process loops to transparently managing the attacking datastream(s) (step 820) and, if needed, again attempt to provision one or more replica application servers (step 825). If the transition is not to be retried or will no longer be retried (step 860), the IDPS (and more specifically, SDCU) provides an indication that processing of the intrusion did not result in a successful transition (step 870), and the process then concludes. Alternatively, if the attacking datastream(s) were successfully transitioned (step 850), the process concludes.

As will be apparent in light of the present disclosure, the inability to provision the requisite component(s) may occur, for example, where sufficient resources to support the provisioning of such component(s), though the likelihood of such a situation is small, given that a stated advantage of cloud-based systems is that the purpose of such systems is to dynamically provision/allocate components/computing resources as may be needed to provide users with the functionality desired. In this regard, it is to be appreciated in light of the present disclosure that the dynamic provisioning of lightweight replicas is of particular benefit in such scenarios, at least because replicas are only provisioned as needed (and thus do not continuously consume resources) and are only provisioned with the resources (e.g., services) needed to address the intrusion at hand. Thus, the dynamic provisioning of lightweight replicas minimizes the impact of such techniques on availability of computing resources and the performance provided by such systems to their users, among other advantages noted earlier herein. Further, an indication that the requisite component(s) were not (successfully) provisioned/allocated will typically be provided to the control unit of the IDPS by SDCU. Such an indication can serve to initiate other actions against the attacking datastream, such as blocking all communications from/to the attacking system, for example.

Figure 9:
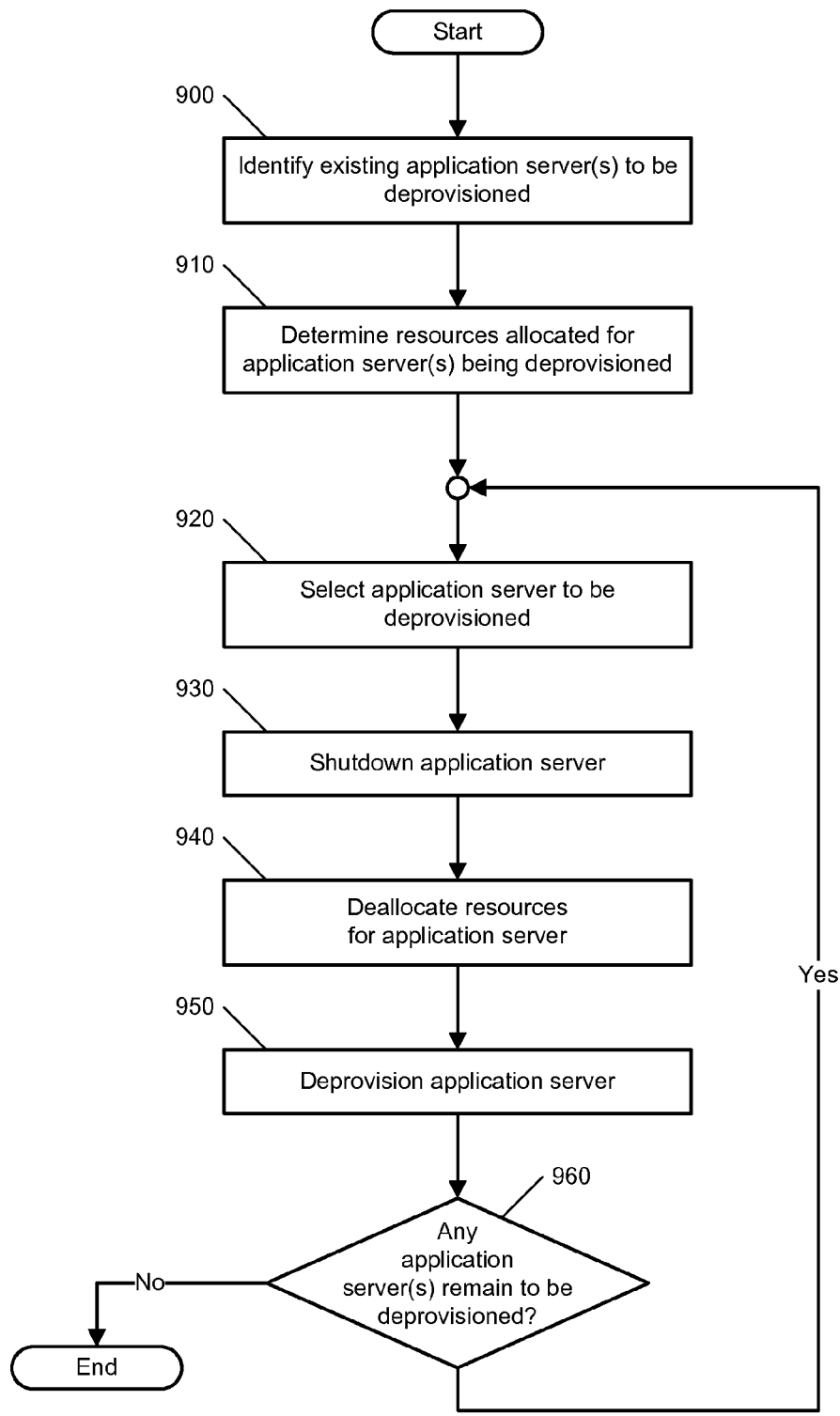
FIG. 9 is a simplified flow diagram illustrating an example of operations performed in deprovisioning one or more application servers, according to one embodiment.

FIG. 9 is a simplified flow diagram illustrating an example of operations performed in the deprovisioning of one or more existing application servers, according to an embodiment of the systems disclosed herein. FIG. 9 depicts an example of a process that effects the deprovisioning of one or more existing application servers, as envisioned by step 670 of FIG. 6. The process of FIG. 9 begins with the identification of any existing application servers that need to be deprovisioned (step 900). A determination is then made as to the resources allocated for these application servers (step 910). Deprovisioning then proceeds with the selection of a given application server to be deprovisioned (step 920). Once selected (step 920), the given application server is shut down (step 930). Resources of the given application server can then be deallocated (step 940). The application server itself can then be deprovisioned (step 950). At this point, a determination is made as to whether any application servers remain to be deprovisioned (step 960). If further application servers remain to be deprovisioned (step 960), the process loops to the selection of the next application server to be deprovisioned (step 920). Alternatively, the process concludes.

Figure 10:
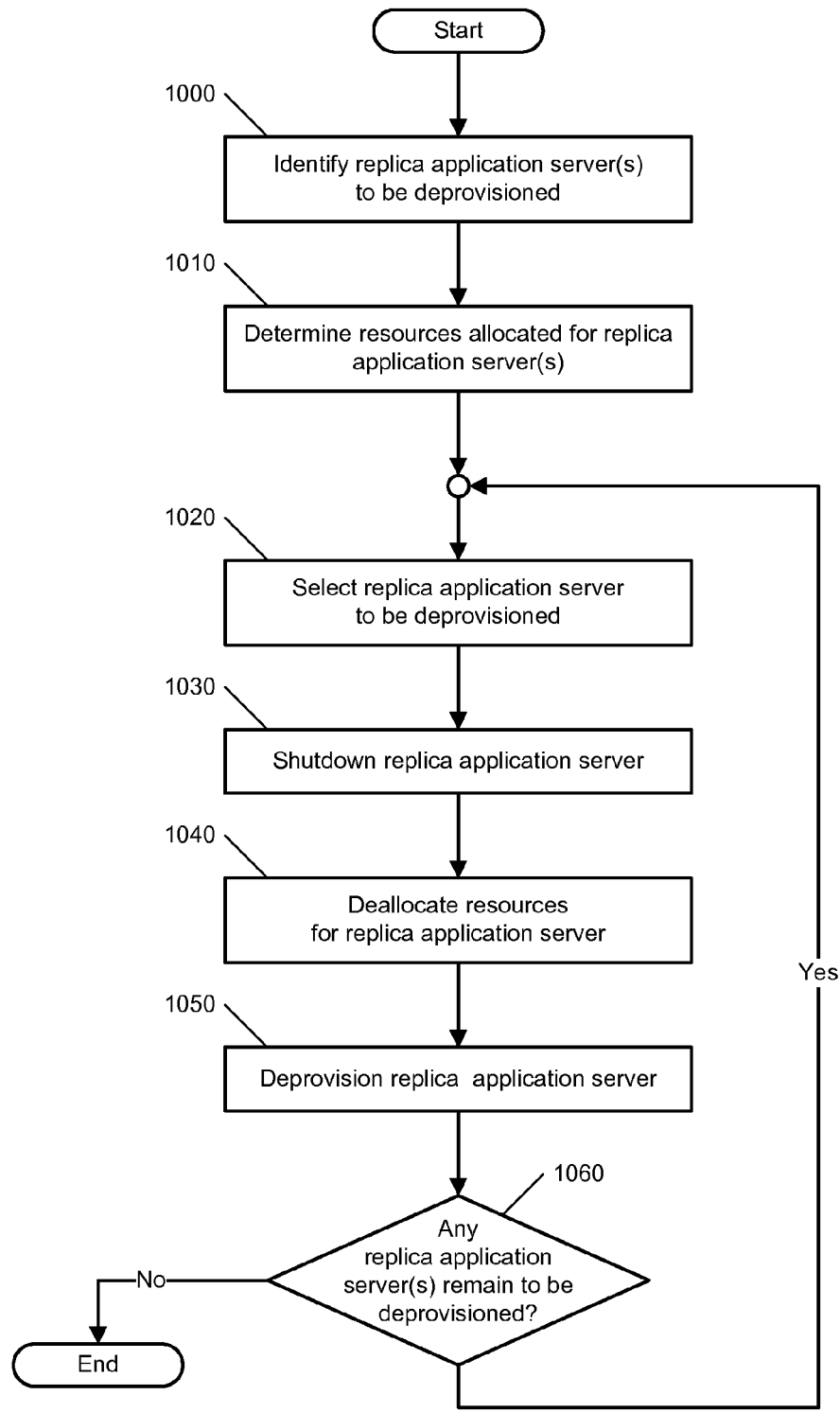
FIG. 10 is a simplified flow diagram illustrating an example of operations performed in deprovisioning one or more replica application servers, according to one embodiment.

FIG. 10 is a simplified flow diagram illustrating an example of certain operations performed in the deprovisioning of one or more application servers, according to embodiments of systems such as those disclosed herein. Once intrusion management is no longer needed (step 660 of FIG. 6), replica application servers provisioned as part of intrusion management can be deprovisioned. To wit, the process depicted in FIG. 10 is an example of the operations performed in effecting the deprovisioning of one or more replica application servers, in the manner envisioned by the deprovisioning of one or more replica application server performed as step 670 of FIG. 6.

The process depicted in FIG. 10 begins with the identification of the one or more replica application servers that are to be deprovisioned (step 1000). A determination is then made as to the resources allocated to these replica application servers (step 1010). Once the replica application servers and their resources are identified (step 1010), one of the replica application servers in question is selected (step 1020). Once selected, the given replica application server is now shut down (step 1030). The resources for this replica application server can then be deallocated (step 1040). The given replica application server is then deprovisioned (step 1050). A determination is then made as to whether any replica application servers remain to be deprovisioned (step 1060). If further replica application servers remain to be deprovisioned (step 1060), the process return to the selection of the next replica application server to be deprovisioned (step 1020). Otherwise, the requisite replica application servers having been deprovisioned, the process concludes.

Figure 11:
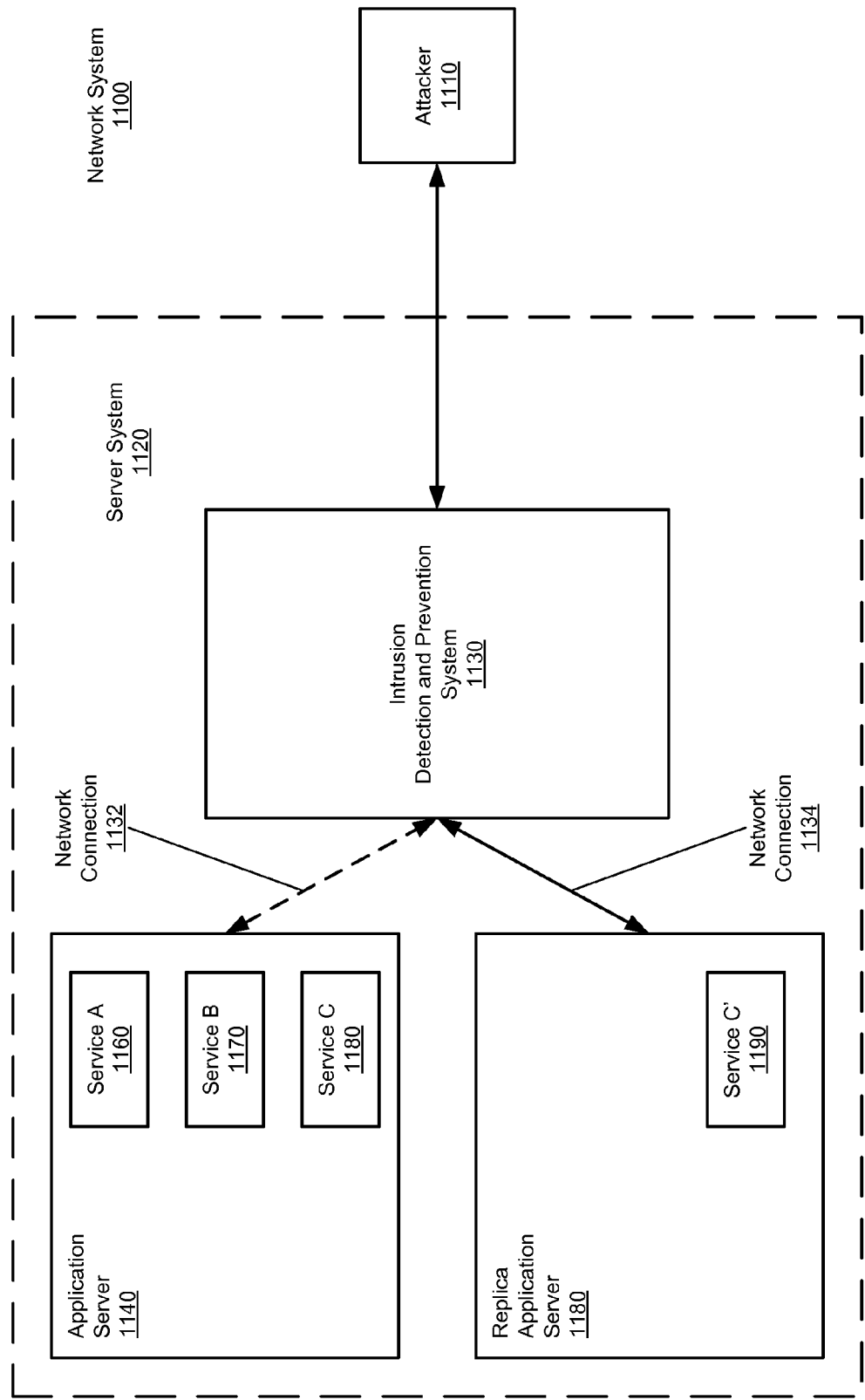
FIG. 11 is a block diagram illustrating an example of an attacker system being transitioned from an application server to a replica application server, according to one embodiment.

FIG. 11 is a block diagram illustrating an example of an attacker system being transitioned from an application server to a replica application server, according to embodiments of systems such as those described herein. As will be appreciated in light of the present disclosure, the block diagram of FIG. 11 also illustrates communications that occur between the attacker, and the existing application server and the replica application server, and the rerouting (redirection) of such communications. The block diagram of FIG. 11 depicts a network system 1100, in which an attacker 1110 attempts to gain unauthorized access to a server system 1120 and its components/resources. Within server system 1120, an intrusion detection and prevention system 1130 receives the various datastreams intended for server system 1120.

In the embodiment depicted in FIG. 11, intrusion detection and prevention system 1130 controls the routing of datastreams to various components (e.g., assumed in FIG. 11 to be some number of application servers), examples of which are depicted as network connections 1132 (representing data communications between the (putative) attacker (attacker 1110) and the original ("target") component (application server 1140)) and 1134 (representing data communications between the (putative) attacker (attacker 1110) and the original ("target") replica component (replica application server 1180)). As depicted in FIG. 11, these application servers include an application server 1140 and a replica application server 1150 (replica application server 1150 having been provisioned as the result of the attacking datastream's detection). In the block diagram of FIG. 11, application server 1140 is depicted as executing a number of services, including a service A 1160, a service B 1170, and a service C 1180. In the scenario depicted in FIG. 11, service C 1180 is under attack by attacker 1110. That being the case, replica application server 1150 is provisioned with a service C' 1190, and the attacking datastream is redirected to replica application server 1150 (as depicted in FIG. 11 by at least some portion of network connection 1132 being redirected to network connection 1134). In so doing, attacker 1110 is presented with what appears to be the original target, but is, in fact, a replica thereof.

Further, as depicted in FIG. 11, attacker 1110 may conduct communications with a number of services provided by application server 1140 (and/or other components of server system 1120), via either a single attacking datastream or a number of such datastreams. In the example of FIG. 11, network connections 1132 and 1134 can be interpreted as representing any number of possible such scenarios. In one scenario, the datastream originally communicated via network connection 1132 is a single datastream, with the redirection resulting in network connection 1134 some portion (or all) of the datastream originally communicated via network connection 1132, and the remaining portions (if any) maintained via network connection 1132. In another scenario, the original communications via network connection 1132 may include multiple datastreams, with the redirection resulting in the redirection of some (or all) of the datastreams originally communicated via network connection 1132 being communicated via network connection 1134, and the remaining datastreams (if any) being communicated via network connection 1132. As will be appreciated, other alternatives and modifications, supporting variants and combinations of the foregoing and other alternatives, will present themselves, in light of the present disclosure. Further, it will also be appreciated that other datastreams (e.g., those of authorized users) can be maintained or terminated during the foregoing operations, as may be desirable in the circumstances at hand.

Moreover, attacker 1110 may also communicate therewith in a non-malicious (and even authorized) manner. For example, such communications might occur, initially, via network connection 1132. Upon a determination that at least some of the communications occurring between attacker 1110 and application server 1140 are suspect, the questionable datastream (or portion of a datastream) is redirected to replica application server 1180, as noted. In this scenario, however, only a subset of the original data communications between attacker 1110 and application server 1140 are determined to be suspect. Thus, network connection 1132 can be maintained for communications between attacker 1110, and service A 1160 and service B 1170, for example. In that case, attacker 1110 would communicate with service A 1160, service B 1170, and service C' 1190, in the manner of prior communications with service A 1160, service B 1170, and service C 1180 (and, for purposes of this discussion, in a manner effectively indistinguishable to attacker 1110). Such an approach allows for not only further analysis of datastreams when the level of risk presented thereby is merely questionable (i.e., such datastreams do not represent a clear and present danger), but also for "spot checking'" datastreams, by employing otherwise-unused computing resource to seamlessly redirect and analyze datastreams on a random (or other) basis. Further, such operations can be integrated into load-balancing operations typically performed in cloud-based environments, in order to further reduce any resource consumption resulting from such operations and simplify such operations.

Further still, as has been noted, datastreams of other users (and thus their access) can be maintained or terminated, individually, in groups, or wholesale. In certain scenarios, the datastreams of one or more other users can also be redirected along with that of an attacker (e.g., if multiple datastreams become suspect, as might be the case in a DDoS attack, for example), or the other user(s) were somehow involved in the situation and redirection of their datastreams were necessary to maintain the façade presented to the attacker.

An Example Computing and Network Environment

As shown above, the systems described herein can be implemented using a variety of computer systems and networks. Examples of such computing and network environments are described below with reference to FIGS. 12 and 13.

Figure 12:
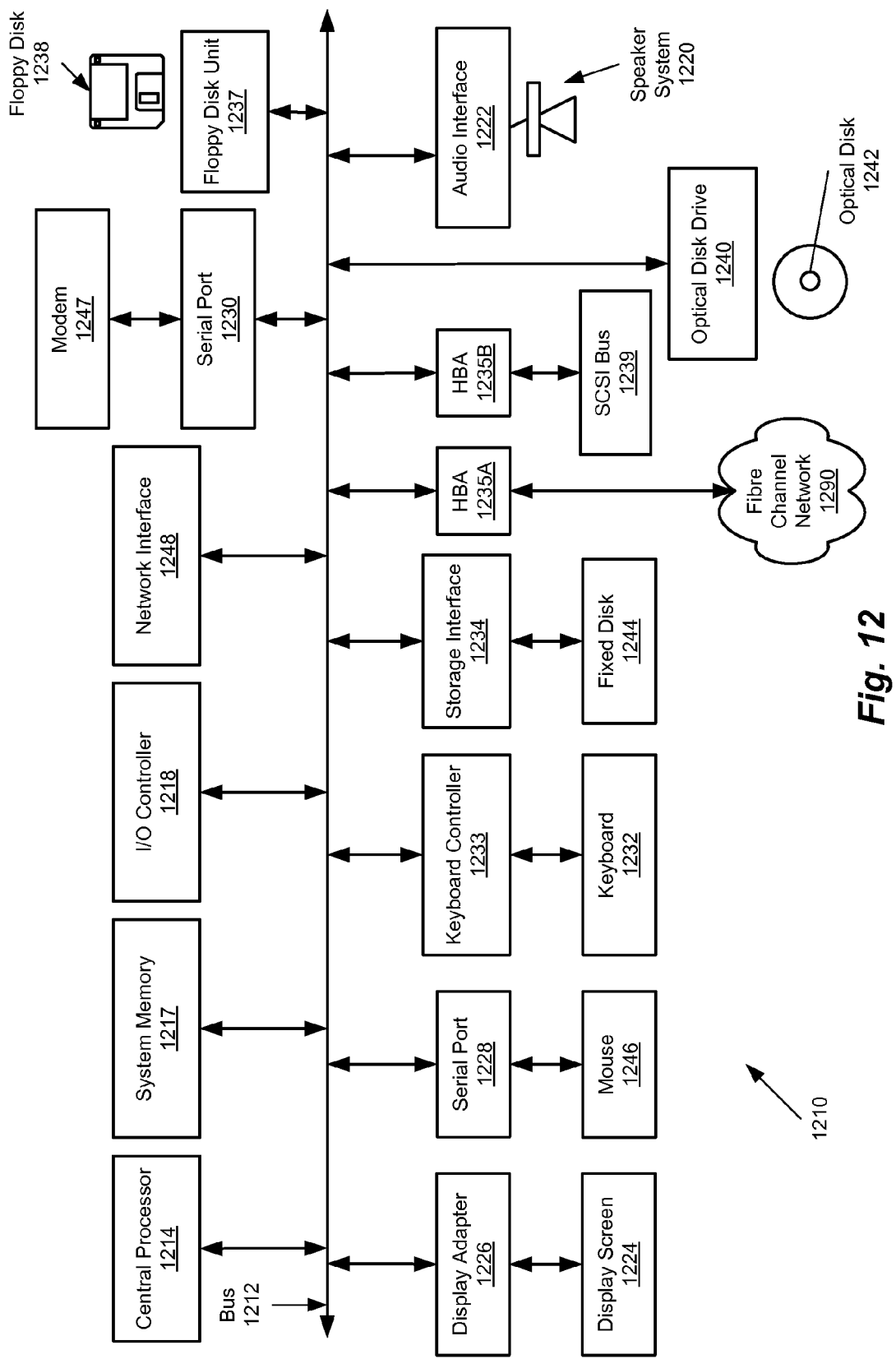
FIG. 12 is a block diagram depicting a computer system suitable for implementing embodiments of the systems described herein.

FIG. 12 depicts a block diagram of a computer system 1210 suitable for implementing aspects of the systems described herein (e.g., servers 130(1)-(N), clients 125(1)-(N), and the like). Computer system 1210 includes a bus 1212 which interconnects major subsystems of computer system 1210, such as a central processor 1214, a system memory 1217 (typically RAM, but which may also include ROM, flash RAM, or the like), an input/output controller 1218, an external audio device, such as a speaker system 1220 via an audio output interface 1222, an external device, such as a display screen 1224 via display adapter 1226, serial ports 1228 and 1230, a keyboard 1232 (interfaced with a keyboard controller 1233), a storage interface 1234, a floppy disk drive 1237 operative to receive a floppy disk 1238, a host bus adapter (HBA) interface card 1235A operative to connect with a Fibre Channel network 1290, a host bus adapter (HBA) interface card 1235B operative to connect to a SCSI bus 1239, and an optical disk drive 1240 operative to receive an optical disk 1242. Also included are a mouse 1246 (or other point-and-click device, coupled to bus 1212 via serial port 1228), a modem 1247 (coupled to bus 1212 via serial port 1230), and a network interface 1248 (coupled directly to bus 1212).

Bus 1212 allows data communication between central processor 1214 and system memory 1217, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1210 are generally stored on and accessed from a computer-readable storage medium, such as a hard disk drive (e.g., fixed disk 1244), an optical drive (e.g., optical drive 1240), a floppy disk unit 1237, or other computer-readable storage medium.

Storage interface 1234, as with the other storage interfaces of computer system 1210, can connect to a standard computer-readable medium for storage and/or retrieval of information, such as a fixed disk drive 1244. Fixed disk drive 1244 may be a part of computer system 1210 or may be separate and accessed through other interface systems. Modem 1247 may provide a direct connection to a remote server via a telephone link or to the Internet via an internet service provider (ISP). Network interface 1248 may provide a direct connection to a remote server via a direct network link to the Internet via a POP (point of presence). Network interface 1248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 12 need not be present to practice the systems described herein. The devices and subsystems can be interconnected in different ways from that shown in FIG. 12. The operation of a computer system such as that shown in FIG. 12 is readily known in the art and is not discussed in detail in this application. Code to implement the modules of the systems described herein can be stored in computer-readable storage media such as one or more of system memory 1217, fixed disk 1244, optical disk 1242, or floppy disk 1238. The operating system provided on computer system 1210 may be MS-DOS®, MS-WINDOWS®, UNIX®, Linux®, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 13:
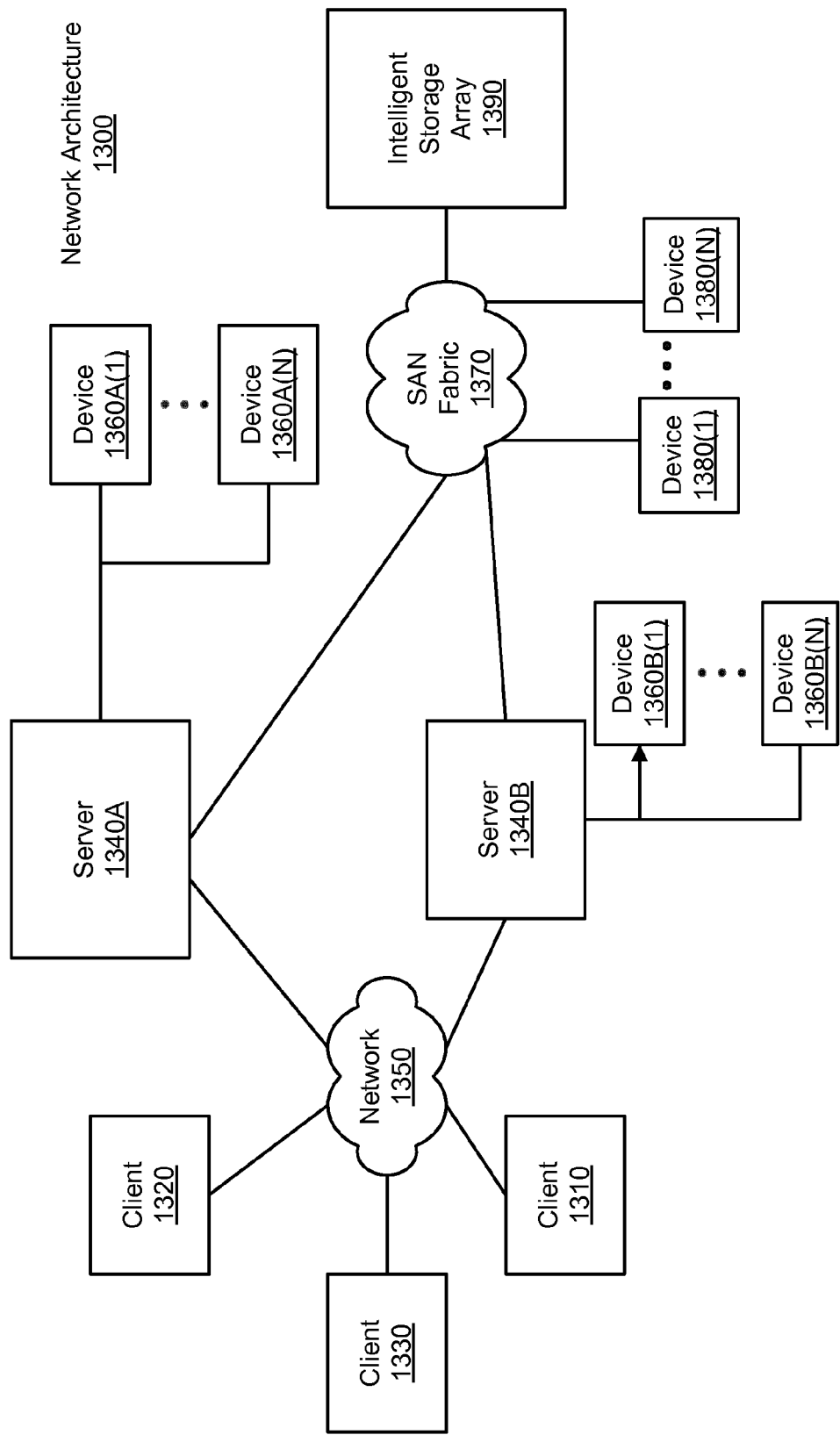
FIG. 13 is a block diagram depicting a network architecture suitable for implementing embodiments of the systems described herein.

FIG. 13 is a block diagram depicting a network architecture 1300 in which client systems 1310, 1320 and 1330, as well as storage servers 1340A and 1340B (any of which can be implemented using computer system 1310), are coupled to a network 1350. Storage server 1340A is further depicted as having storage devices 1360A(1)-(N) directly attached, and storage server 1340B is depicted with storage devices 1360B(1)-(N) directly attached. Storage servers 1340A and 1340B are also connected to a SAN fabric 1370, although connection to a storage area network is not required for operation. SAN fabric 1370 supports access to storage devices 1380(1)-(N) by storage servers 1340A and 1340B, and so by client systems 1310, 1320 and 1330 via network 1350. Intelligent storage array 1390 is also shown as an example of a specific storage device accessible via SAN fabric 1370.

With reference to computer system 1210, modem 1247, network interface 1248 or some other method can be used to provide connectivity from each of client computer systems 1310, 1320 and 1330 to network 1350. Client systems 1310, 1320 and 1330 are able to access information on storage server 1340A or 1340B using, for example, a web browser or other client software (not shown). Such a client allows client systems 1310, 1320 and 1330 to access data hosted by storage server 1340A or 1340B or one of storage devices 1360A(1)-(N), 1360B(1)-(N), 1380(1)-(N) or intelligent storage array 1390. FIG. 18 depicts the use of a network such as the Internet for exchanging data, but the systems described herein are not limited to the Internet or any particular network-based environment.

Other Embodiments

The systems described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing describes embodiments including components contained within other components (e.g., the various elements shown as components of computer system 1210). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:

1. A method implemented in a computer system that comprises a processor and a memory coupled to one another, comprising:
   creating, using the processor of the computer system, an application server using information from an application database;
   detecting, using the processor of the computer system, whether an intrusion into the application server has occurred, wherein
   the application server is provisioned in a server system,
   the intrusion is an attack on one or more components of the application server,
   the attack is conducted via a datastream between a first computing system and the application server, and
   the attack has not compromised the one or more components of the application server; and
   in response to the intrusion being detected,
   dynamically creating, using the processor of the computer system, a replica application server in the server system, wherein
   the replica application server is a container-based replica, wherein the container-based replica is a container virtualization where each container virtualization created executes under a same kernel and each container virtualization has its own file system, processes, and memory;
   the replica application server is dynamically created using information from the application database;
   the replica application server is provisioned with one or more replica components that correspond to the one or more components of the application server associated with the attack, and
   the replica application server is dynamically created after the attack is detected; and
   transitioning the datastream from the one or more components of the application server to the one or more components of the replica application server.

2. The method of claim 1, wherein
the replica application server is a lightweight replica of the application server.

3. The method of claim 1, further comprising:
provisioning the application server, wherein
the application server is provisioned with a plurality of services, and
the replica application server is provisioned with one or more of the plurality of services.

4. The method of claim 3, wherein
the first computing system communicates with the one or more of the plurality of services.

5. The method of claim 4, wherein
the first computing system communicates with a service of the plurality of services, and
the service of the plurality of services other than the one or more of the plurality of services.

6. The method of claim 1, further comprising:
generating an alarm, wherein
the alarm is generated in response to the detecting the intrusion, and
the replica application server is dynamically provisioned in response to the alarm.

7. The method of claim 1, wherein the transitioning comprises:
forwarding packets of the datastream to the replica application server.

8. The method of claim 7, wherein
the dynamically creating the replica application server comprises
associating a network address to the replica application server, wherein the network address is the same as a network address associated with the application server, and
the transitioning further comprises
forwarding packets of the datastream to the network address.

9. The method of claim 7, wherein
the dynamically creating the replica application server comprises
associating a new network address to the replica application server, wherein the new network address is different from a network address associated with the application server, and
the transitioning further comprises
forwarding packets of the datastream to the new network address of the replica application server.

10. The method of claim 1, further comprising:
analyzing the attack, wherein the analyzing is performed after the transitioning.

11. The method of claim 1, wherein
the compromise of the application server would comprise at least one of an unauthorized access of the application server, or
an interference with operation of the application server.

12. The method of claim 1, wherein
the replica application server is not configured to support each component of the one or more components of the application server.

13. The method of claim 1, wherein
the replica application server is only configured to support the one or more components of the application server under attack by virtue of being provisioned with only the one or more replica application components that correspond to the one or more components of the application server under attack.

14. The method of claim 1, wherein
the detecting comprises performing a signature-based detection technique.

15. The method of claim 1, wherein
the dynamically creating and the transitioning are performed in response to the intrusion being detected.
16. The method of claim 1, wherein
the provisioning and the transitioning are performed before the application server has been compromised.
17. A computer program product comprising:
a plurality of instructions, comprising
a first set of instructions, executable on a computer system, configured to detect whether an intrusion into an application server has occurred, wherein
the application server is created using information from an application database;
the application server is provisioned in a server system,
the intrusion is an attack on one or more components of the application server,
the attack is conducted via a datastream between a first computing system and the application server, and
the attack has not compromised the one or more components of the application server;
a second set of instructions, executable on the computer system, configured to dynamically create a replica application server in the server system in response to the intrusion being detected, wherein
the replica application server is a container-based replica, wherein the container-based replica is a container virtualization where each container virtualization created executes under a same kernel and each container virtualization has its own file system, processes, and memory;
the replica application server is created using information from the application database;
the replica application server is provisioned with one or more replica components that correspond to the one or more components of the application server associated with the attack, and
the replica application server is dynamically provisioned after the attack is detected; and
a third set of instructions, executable on the computer system, configured to transition the datastream from the one or more components of the application server to the one or more components of the replica application server; and
a non-transitory computer-readable storage medium, wherein the instructions are encoded in the non-transitory computer-readable storage medium.
18. The computer program product of claim 17, wherein the instructions further comprise:
a fourth set of instructions, executable on the computer system, configured to provision the application server, wherein
the application server is provisioned with a plurality of services, and
the replica application server is provisioned with one or more of the plurality of services.
19. The computer program product of claim 17, wherein the instructions further comprise:
a fourth set of instructions, executable on the computer system, configured to generate an alarm, wherein
the alarm is generated in response to detecting the intrusion, and
the replica application server is dynamically created in response to the alarm.
20. The computer program product of claim 17, wherein the instructions further comprise:

a fourth set of instructions, executable on the computer system, configured to forward packets of the datastream to the replica application server, wherein
the second set of instructions comprises
a first subset of instructions, executable on the computer system, configured to associate a network address to the replica application server, wherein the network address is the same as a network address associated with the application server, and
the third set of instructions comprises
a second subset of instructions, executable on the computer system, configured to forward packets of the datastream to the network address.
21. The computer program product of claim 17, wherein the instructions further comprise:
a fourth set of instructions, executable on the computer system, configured to forward packets of the datastream to the replica application server, wherein
the second set of instructions comprises
a first subset of instructions, executable on the computer system, configured to associate a new network address to the replica application server, wherein the new network address is different from a network address associated with the application server, and
the third set of instructions comprises
a second subset of instructions, executable on the computer system, configured to forward packets of the datastream to the new network address of the replica application server.
22. The computer program product of claim 17, wherein
the application server is provisioned with a plurality of services, and
the replica application server is provisioned with one or more of the plurality of services.
23. The computer program product of claim 22, wherein
the first computing system communicates with the one or more of the plurality of services.
24. A computer system comprising:
one or more processors;
a non-transitory computer-readable storage medium coupled to the one or more processors; and
a plurality of instructions, encoded in the non-transitory computer-readable storage medium and configured to cause the one or more processors to
create an application server using information from an application database and detect whether an intrusion into the application server has occurred, wherein
the application server is provisioned in a server system,
the intrusion is an attack on one or more components of the application server,
the attack is conducted via a datastream between a first computing system and the application server, and
the attack has not compromised the one or more components of the application server; and
in response to the intrusion being detected,
dynamically create a replica application server in the server system, wherein
the replica application server is a container-based replica, wherein the container-based replica is a container virtualization where each container virtualization created executes under a same kernel and each container virtualization has its own file system, processes, and memory;
the replica application server is dynamically created using information from the application database, the replica application server is provisioned with one or more replica components that correspond to the one or more components of the application server associated with the attack, the replica application server is dynamically created after the attack is detected; and transition the datastream from the one or more components of the application server to the one or more components of the replica application server.

* * * * *